(12) United States Patent
Watanabe et al.

(10) Patent No.: US 8,771,876 B2
(45) Date of Patent: Jul. 8, 2014

(54) POSITIVE ELECTRODE ACTIVE MATERIAL, METHOD FOR MANUFACTURING POSITIVE ELECTRODE ACTIVE MATERIAL AND NONAQUEOUS ELECTROLYTE BATTERY

(75) Inventors: Haruo Watanabe, Kanagawa (JP); Tomoyo Ooyama, Fukushima (JP); Yosuke Hosoya, Fukushima (JP); Shigeru Fujita, Fukushima (JP)

(73) Assignee: Sony Corporation, Tokyo (PA)

( * ) Notice: Subject to any disclaimer, the term of this patent is extended or adjusted under 35 U.S.C. 154(b) by 1037 days.

(21) Appl. No.: 12/761,172

(22) Filed: Apr. 15, 2010

(65) Prior Publication Data

US 2010/0273057 A1   Oct. 28, 2010

(30) Foreign Application Priority Data

Apr. 22, 2009   (JP) ................. P2009-103791
Jun. 17, 2009   (JP) ................. P2009-144363

(51) Int. Cl.
*H01M 4/58*   (2010.01)
*H01M 4/00*   (2006.01)

(52) U.S. Cl.
USPC ............. 429/223; 429/231.95; 252/182.1

(58) Field of Classification Search
None
See application file for complete search history.

(56) References Cited

U.S. PATENT DOCUMENTS 5,718,989 A * 2/1998 Aoki et al. .................. 429/223
5,731,105 A * 3/1998 Fleischer et al. ............ 429/317
2007/0202393 A1* 8/2007 Hu et al. ....................... 429/53
2007/0281212 A1* 12/2007 Thackeray et al. ...... 429/231.1

FOREIGN PATENT DOCUMENTS

| JP | 59-60818 | 4/1984 |
| JP | 62-090863 | 4/1987 |
| JP | 06-111820 | 4/1994 |
| JP | 06-215800 | 8/1994 |
| JP | 08-069791 | 3/1996 |
| JP | 09-231963 | 9/1997 |
| JP | 10-152328 | 6/1998 |
| JP | 11-154535 | 6/1999 |
| JP | 11-329444 | 11/1999 |
| JP | 2000-348723 | 12/2000 |
| JP | 2002-289188 | 10/2002 |
| JP | 2003-123755 | 4/2003 |
| JP | 2004-214116 | 7/2004 |
| JP | 2007-273106 | 10/2007 |
| JP | 2007-273108 | 10/2007 |

OTHER PUBLICATIONS http://www.merriam-webster.com/dictionary/tungstosilicic%20acid.*
http://www.merriam-webster.com/dictionary/coating.*

* cited by examiner

*Primary Examiner* — Patrick Ryan
*Assistant Examiner* — Christopher Domone
(74) *Attorney, Agent, or Firm* — K&L Gates LLP

(57) ABSTRACT

A positive electrode active material includes a lithium complex oxide particle, and a coating layer formed on at least a part of the surface of the lithium complex oxide particle. The lithium complex oxide particle is a lithium complex oxide particle composed mainly of nickel. The coating layer contains an oxo acid and/or an oxo acid compound, an acidity of the surface of the lithium complex oxide particle composed mainly of nickel is increased by the coating layer. The acidity is determined based on a pH of a supernatant of water in a state where after 1.0 part by weight of the lithium complex oxide particle composed mainly of nickel and having a coating layer formed thereon is dispersed in 50 parts by weight of water. The lithium complex oxide particle sediments, and the pH is less than 8.0.

6 Claims, 4 Drawing Sheets

POSITIVE ELECTRODE ACTIVE MATERIAL, METHOD FOR MANUFACTURING POSITIVE ELECTRODE ACTIVE MATERIAL AND NONAQUEOUS ELECTROLYTE BATTERY

CROSS REFERENCES TO RELATED APPLICATIONS

The present application claims priority to Japanese Priority Patent Application JP 2009-103791 filed in the Japan Patent Office on Apr. 22, 2009 and Japanese Priority Patent Application JP 2009-144363 filed in the Japan Patent Office on Jun. 17, 2009, the entire content of which is hereby incorporated by reference.

BACKGROUND

The present disclosure relates to a positive electrode active material, a method for manufacturing a positive electrode active material and a nonaqueous electrolyte battery.

In recent years, there has been an increased demand for small-sized and high-capacity secondary batteries along with the spread of portable appliances such as video cameras and laptop personal computers. Secondary batteries currently used include a nickel-cadmium battery and a nickel-hydrogen battery each using an alkaline electrolytic solution. However, the voltage of such a battery is low as about 1.2 V, and therefore, it is difficult to enhance an energy density. For that reason, studies have been made as to a lithium metal secondary battery using a lithium metal having a specific gravity of 0.534, a value of which is the lowest in solid elements, is also very poor in a potential and has the largest current capacity per unit weight in metal negative electrode materials.

However, in secondary batteries using a lithium metal for a negative electrode, when charged, dendritic lithium (dendrite) is deposited on the surface of the negative electrode and grows due to a charge and discharge cycle. Not only the growth of the dendrite deteriorates a charge and discharge cycle characteristic of the secondary battery, but in the worst case, the grown dendrite breaks through a diaphragm (separator) to be disposed so as to prevent a positive electrode from being in contact with a negative electrode. As a result, there gives rise to a problem that an internal short circuit is generated to cause thermorunaway, whereby the battery is broken.

In light of this, for example, as disclosed in JP-A-62-90863, a secondary battery in which a carbonaceous material such as cokes is used as a negative electrode, and charge and discharge are repeated by doping and dedoping an alkali metal ion was proposed. According to this, it has been noted that the foregoing problem of deterioration of the negative electrode in repeating charge and discharge can be avoided.

On the other hand, as a result of search and development of active materials showing a high potential as a positive electrode active material, those showing a battery voltage of about 4 V have appeared, and attention is paid thereto. Inorganic compounds such as alkali metal-containing transition metal oxides or transition metal chalcogens are known as such an active material.

In particular, lithium transition metal complex oxides composed mainly of nickel or cobalt, such as $Li_xNiO_2$ ($0<x\leq1.0$) and $Li_xCoO_2$ ($0<x\leq1.0$), are the most promising from the standpoints of high potential, stability and long life. Above all, lithium transition metal complex oxides composed mainly of nickel are a positive electrode active material showing a relatively high potential. By using such a lithium transition metal complex oxide in a battery, it is expected that the charge current capacity is increased and that the energy density is increased.

However, in secondary batteries using, as a positive electrode active material, a lithium transition metal complex oxide composed mainly of nickel, the gas generation in the inside of the battery is easily caused. For that reason, there was involved a problem that an internal pressure of the battery is easy to rise. In particular, in batteries using a laminated film for an exterior, there was involved a problem that the battery is easily swollen due to the gas generation.

In consequence, it is desirable to provide a positive electrode active material capable of suppressing the gas generation, a method for manufacturing a positive electrode active material and a nonaqueous electrolyte battery.

SUMMARY

One embodiment of the invention is concerned with a positive electrode active material including a lithium complex oxide particle and a coating layer formed on at least a part of the surface of the lithium complex oxide particle, wherein the lithium complex oxide particle is a lithium complex oxide particle composed mainly of nickel; the coating layer contains an oxo acid and/or an oxo acid compound; an acidity of the surface of the lithium complex oxide particle composed mainly of nickel is increased by the coating layer; the acidity is determined based on a pH of a supernatant of water in a state where after 1.0 part by weight of the lithium complex oxide particle composed mainly of nickel and having a coating layer formed thereon is dispersed in 50 parts by weight of water, the lithium complex oxide particle sediments; and the pH is less than 8.0.

Another embodiment is concerned with a method for manufacturing a positive electrode active material including the steps of cladding an oxo acid and/or an oxo acid compound on a lithium complex oxide particle composed mainly of nickel; and heat treating the lithium complex oxide particle composed mainly of nickel and having an oxo acid and/or an oxo acid compound cladded thereon, wherein an acidity of the surface of the lithium complex oxide particle composed mainly of nickel is increased through the cladding step and the heat treatment step; the acidity is determined based on a pH of a supernatant of water in a state where after the heat treatment step, after 1.0 part by weight of the lithium complex oxide particle composed mainly of nickel and having an oxo acid and/or an oxo acid compound cladded thereon is dispersed in 50 parts by weight of water, the lithium complex oxide particle sediments; and the pH is less than 8.0.

Still another embodiment is concerned with a nonaqueous electrolyte battery including a positive electrode, a negative electrode and an electrolyte, wherein the positive electrode includes a positive electrode active material; the positive electrode active material includes a lithium complex oxide particle and a coating layer formed on at least a part of the surface of the lithium complex oxide particle; the lithium complex oxide particle is a lithium complex oxide particle composed mainly of nickel; the coating layer contains an oxo acid and/or an oxo acid compound; an acidity of the surface of the lithium complex oxide particle composed mainly of nickel is increased by the coating layer; the acidity is determined based on a pH of a supernatant of water in a state where after 1.0 part by weight of the lithium complex oxide particle composed mainly of nickel and having a coating layer formed thereon is dispersed in 50 parts by weight of water, the lithium complex oxide particle sediments; and the pH is less than 8.0.

Yet another embodiment of the invention is concerned with a positive electrode active material including a lithium complex oxide and a coating layer provided on at least a part of the surface of the lithium complex oxide, wherein the lithium complex oxide is a lithium complex oxide composed mainly of nickel; and the coating layer contains a heteropoly acid and/or a heteropoly acid compound.

Another embodiment is concerned with a method for manufacturing a positive electrode active material including the steps of cladding a heteropoly acid and/or a heteropoly acid compound on a lithium complex oxide composed mainly of nickel; and heat treating the lithium complex oxide composed mainly of nickel and having a heteropoly acid and/or a heteropoly acid cladded thereon.

Further another embodiment of the invention is concerned with a nonaqueous electrolyte battery including a positive electrode, a negative electrode and an electrolyte, wherein the positive electrode includes a positive electrode active material; the positive electrode active material includes a lithium complex oxide and a coating layer provided on at least a part of the surface of the lithium complex oxide; the lithium complex oxide is a lithium complex oxide composed mainly of nickel; and the coating layer contains a heteropoly acid and/or a heteropoly acid compound.

In accordance with embodiments, an oxidation activity of the surface of the lithium complex oxide particle composed mainly of nickel in a charged state can be suppressed. Also, according to this, decomposition of a nonaqueous electrolytic solution or the like on the surface of the positive electrode active material can be suppressed. Also, a carbonic acid root contained in the lithium complex oxide particle composed mainly of nickel can be reduced.

In accordance with the embodiments, the surface of the lithium complex oxide composed mainly of nickel is coated with a heteropoly acid and/or a heteropoly acid compound. According to this constitution, an oxidation activity of the surface of the lithium complex oxide particle composed mainly of nickel in a charged state can be suppressed. Also, according to this, decomposition of a nonaqueous electrolytic solution or the like on the surface of the positive electrode active material can be suppressed. Also, a carbonic acid root contained in the lithium complex oxide particle composed mainly of nickel can be reduced by cladding a heteropoly acid and/or a heteropoly acid compound.

According to the embodiments, the gas generation to be caused due to decomposition of a nonaqueous electrolytic solution component or the like can be suppressed. Also, the gas generation from the positive electrode active material itself can be suppressed.

Additional features and advantages are described herein, and will be apparent from the following Detailed Description and the figures.

DETAILED DESCRIPTION

Figure 1:
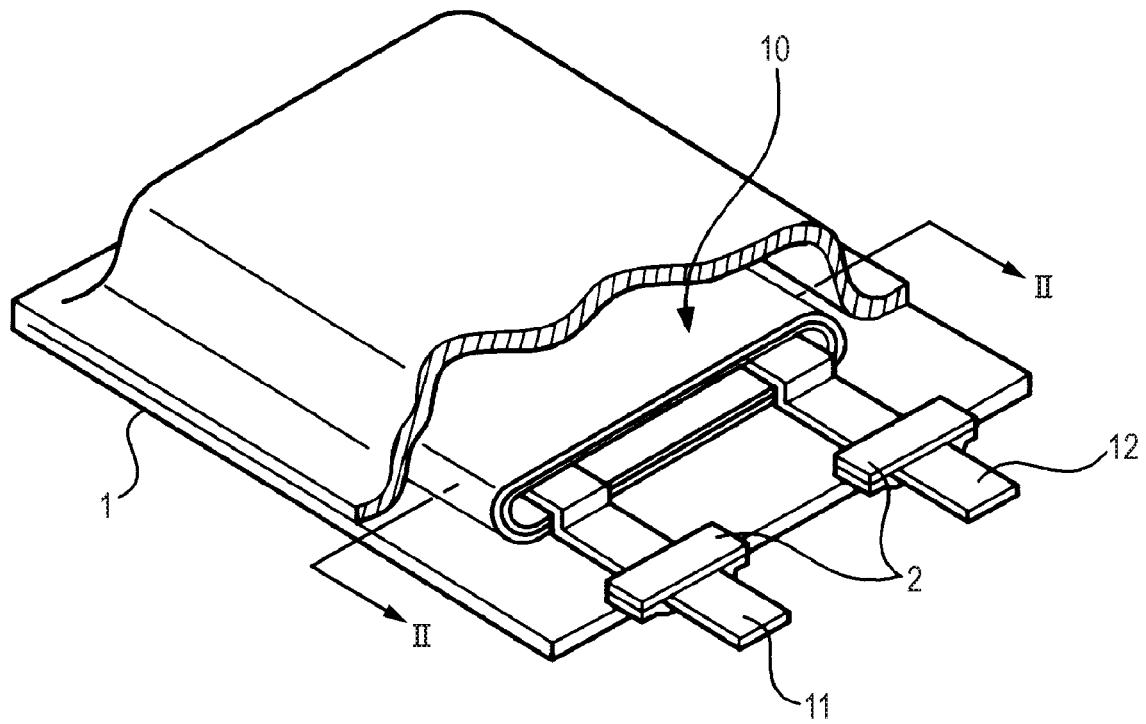
FIG. 1 is a perspective view showing a configuration example of a nonaqueous electrolyte battery according to an embodiment.

Embodiments are hereunder described with reference to the accompanying drawings. The description is made in the following order.
1. First Embodiment (positive electrode active material)
2. Second Embodiment (manufacturing method of positive electrode active material)
3. Third Embodiment (first example of nonaqueous electrolyte battery)
4. Fourth Embodiment (second example of nonaqueous electrolyte battery)
5. Fifth Embodiment (third example of nonaqueous electrolyte battery)
6. Sixth Embodiment (second example of positive electrode active material)
7. Seventh Embodiment (second example of manufacturing method of positive electrode active material)
8. Eighth Embodiment (fourth example of nonaqueous electrolyte battery)
9. Ninth Embodiment (fifth example of nonaqueous electrolyte battery)
10. Tenth Embodiment (sixth example of nonaqueous electrolyte battery)
11. Other embodiment (modification example)

1. First Embodiment (Positive Electrode Active Material)

First of all, for the purpose of making it easy to understand the embodiments, the technical background relative to a positive electrode active material according to the First Embodiment is described.

A complex oxide composed mainly of nickel, for example, lithium nickelate ($LiNiO_2$) and nickel based oxides obtained by substituting a part of nickel of lithium nickelate with other metal can be used as a positive electrode active material for nonaqueous electrolyte batteries. Also, a complex oxide composed mainly of cobalt, for example, lithium cobaltate ($LiCoO_2$) and cobalt based oxides obtained by substituting a part of cobalt of lithium cobaltate with other metal can be used as a positive electrode active material for nonaqueous electrolyte batteries.

As compared with the complex oxide composed mainly of cobalt, the complex oxide composed mainly of nickel is high in economy because a content of cobalt which is a material that is instable in natural resources and expensive is small. Furthermore, as compared with the complex oxide composed mainly of cobalt, the complex oxide composed mainly of nickel has such an advantage that its current capacity is large, and it is desirable to more increase this advantage.

On the other hand, in a secondary battery using a lithium complex oxide composed mainly of nickel as a positive electrode active material, there are encountered such problems that an internal pressure rises following the gas generation in the inside and that in a laminate-enclosed battery, blister is easily caused. Thus, it is demanded to solve these problems.

The positive electrode active material according to the First Embodiment is to cope with the foregoing demand and has such an effect that a lithium complex oxide composed mainly of nickel is modified, thereby reducing the gas generation caused when used for batteries.

[Re: Suppression of Gas Generation]

In the gas generation of a battery, the following Factor 1 and Factor 2 are a common view as factors to be caused due to a positive electrode active material.

(Factor 1)

A carbonic acid root contained in the positive electrode active material produces a carbonic acid gas by an acid component derived from a nonaqueous electrolytic solution.

(Factor 2)

An organic component of a nonaqueous electrolytic solution or the like is oxidized by a strong oxidizing power of the positive electrode active material in a charged state, thereby producing a carbonic acid gas or carbon monoxide.

Taking into consideration the Factor 1 and Factor 2, the gas generation can be suppressed by carrying out an effective treatment for lowering a content of the carbonic acid root of the positive electrode active material and an effective treatment for surface treating a lithium complex oxide composed mainly of nickel, thereby suppressing an oxidation activity of the surface.

Investigations were made regarding interactions between a carbonic acid gas as one of causes of the gas generation and a positive electrode active material. That is, investigations were made regarding the mechanism in which the carbonic acid gas is adsorbed onto the positive electrode active material. According to these investigations, the following have become clear.

A carbonic acid gas is easily adsorbed onto a highly basic lithium complex oxide particle (positive electrode active material) such as a lithium complex oxide composed mainly of nickel, and this adsorbed carbonic acid gas becomes a residual carbonic acid component of the positive electrode active material.

In a battery in which the positive electrode active material having this residual carbonic acid component is installed, a carbonic acid gas is separated from the residual carbonic acid component due to a substitution reaction between the residual carbonic acid component and an acidic component produced from an electrolyte or the like, and this carbonic acid gas component becomes a cause for the blister of a battery.

It is not the case that the adsorption of the carbonic acid gas onto the positive electrode active material is advanced when the surface is merely basic, but adsorbed water is required. That is, in order that the carbonic acid gas may adsorb onto the positive electrode active material, the presence of a surface hydroxyl group which is chemical adsorbed water is required on the surface of the positive electrode active material, and in particular, the presence of a basic surface hydroxyl group is required.

The adsorption of the carbonic acid gas onto the positive electrode active material is advanced through a reaction between the surface hydroxyl group and the carbonic acid gas to form a bicarbonate group, and the higher the basicity of the surface hydroxyl group, the more easily this reaction is advanced. The thus formed bicarbonate group causes a dehydration reaction with an adjacent surface hydroxyl group and is adsorbed as a bidentate bonded carbonic acid group onto the surface. The thus once bidentate bonded carbonic acid group cannot be easily separated.

According to the foregoing facts, the following are found out.

The higher the basicity of the surface hydroxyl group contained in the positive electrode active material, the more easily the foregoing reaction for forming a bicarbonate group through the reaction between a surface hydroxyl group and a carbonic acid gas is advanced. In view of this fact, the lowness of a Brønsted basicity of the positive electrode active material suppresses the progress of the reaction for forming a bicarbonate group through the reaction between a surface hydroxyl group and a carbonic acid gas, and therefore, an increase of a carbonic acid component causing the gas generation during the process is suppressed.

Also, the lowness of a Brønsted basicity of the positive electrode active material is effective for suppressing the gelation of a binder. Furthermore, though a revealment mechanism has not been elucidated yet, the lowness of a Brønsted basicity of the positive electrode active material is also effective for reducing the carbonic acid gas generation to be caused due to the foregoing Factor 2.

[Relationship Between Basicity Control and Discharge Capacity]

As described previously, though the lowness of a Brønsted basicity of the positive electrode active material is effective for suppressing the gas generation or the like, when the basicity of the surface of the positive electrode active material is reduced, the capacity of charge and discharge at a high current is lowered.

This is because the acidic component is cladded on the surface of the positive electrode active material, whereby an inert layer is formed; lithium of the surface layer loses the mobility; or as a result, the diffusion resistance of a lithium ion in the surface layer becomes high.

[Re: Positive Electrode Active Material According to First Embodiment]

The positive electrode active material according to the First Embodiment is one obtained by modifying a lithium complex oxide particle composed mainly of nickel such that an acidity of the surface of the positive electrode active material is controlled, thereby enabling one to obtain an effect for suppressing the gas generation under a restriction that a lowering of the capacity does not become large.

That is, the positive electrode active material according to the First Embodiment is one obtained by subjecting a particle of a lithium complex oxide composed mainly of nickel to a surface treatment. This positive electrode active material is, for example, obtained by cladding an oxo acid and/or an oxo acid compound on a lithium complex oxide particle composed mainly of nickel and then heat treating it. The thus obtained positive electrode active material includes a particle of a lithium complex oxide composed mainly of nickel and a coating layer formed on at least a part of the surface of the complex oxide particle.

Then, in the positive electrode active material according to the First Embodiment, the discharge capacity is lowered due to the formation of the coating layer by less than 5% relative to the discharge capacity of the lithium complex oxide particle prior to the formation of a coating layer.

A lowering rate of the discharge capacity is, for example, determined based on a discharge capacity of the positive electrode active material in the case where a prescribed cell for the measurement is prepared, charged at a prescribed charge current until the voltage reaches 4.25 V (vs. a lithium metal potential) and then discharged at a discharge current of not more than 1 C until the voltage reaches 2.50 V (vs. a lithium metal potential). This lowering rate of the discharge capacity is a lowering rate in the case where the discharge capacity of the positive electrode active material prior to the surface treatment (lithium complex oxide compound composed mainly of nickel prior to the formation of a coating layer) and the discharge capacity of the positive electrode active material after the surface treatment (lithium complex oxide composed mainly of nickel after the formation of a coating layer) are compared with each other.

Furthermore, the positive electrode active material according to the First Embodiment is one in which an acidity of the surface is increased under a restriction of this lowering rate of the discharge capacity.

This acidity is determined based on a pH of a supernatant of water in a state where after 1.0 part by weight of the lithium complex oxide particle composed mainly of nickel and having a coating layer formed thereon is dispersed in 50 parts by weight of water, the lithium complex oxide particle sediments. This pH is specified to be less than 8.0.

In determining the acidity or basicity by pH which becomes a basis of the foregoing acidity, the foregoing specified value can be attained by using an excessive acid component in the surface treatment of the positive electrode active material. However, in that case, following an increase in the proportion of the acid component occupying in the positive electrode active material, a lowering of the capacity to be caused due to a lowering of the ratio of the positive electrode active material and a lowering of the capacity to be caused following a chemical change of the surface layer of the positive electrode active material by the acid component are caused. Accordingly, it is preferable that the foregoing acidity or basicity is attained under a restriction of the foregoing lowering of the capacity.

[Lithium Complex Oxide Particle]

The lithium complex oxide particle is a particle of a lithium complex oxide containing, as constituent elements, lithium (Li) and nickel (Ni). This lithium complex oxide is one composed mainly of nickel. The terms "composed mainly of nickel" as referred to herein mean that among metal elements (exclusive of lithium) constituting the lithium complex oxide, the nickel component is contained in the largest amount.

This lithium complex oxide particle may be any of a primary particle or a secondary particle obtained by aggregating plural primary particles. This lithium complex oxide is one in which the nickel component is contained in a larger amount than the cobalt component, and its average composition is, for example, represented by the following formula (1).

$$Li_aNi_xCo_yAl_zO_2 \qquad (1)$$

In the formula (1), nickel (Ni) is able to be substituted with one or two or more kinds of metal elements selected from the group consisting of manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La) and cerium (Ce) within the range of not more than 0.1 of Ni when the amount of the whole of Ni is defined to be 1. Also, in the formula (1), a, x, y and z are values falling within the ranges of $(0.20 \leq a \leq 1.40)$, $(0.60 < x < 0.90)$, $(0.10 < y < 0.40)$ and $(0.01 < z < 0.20)$, respectively; and x, y and z have the relationship of $(x+y+z)=1$.

Here, in the formula (1), the range of a is, for example, $(0.20 \leq a \leq 1.40)$. When the value of a is smaller than the foregoing range, a layered rock salt structure of the crystal structure as the basis of the function of the positive electrode active material collapses, whereby recharge becomes difficult, and the capacity is significantly lowered. When the value of a is larger than the foregoing range, lithium diffuses outside the foregoing complex oxide particle, whereby not only the control of the basicity in a subsequent treatment step is impaired, but hindrance of the acceleration of gelation during kneading of a positive electrode paste is finally caused.

The range of x is, for example, $(0.60 < x < 0.90)$, preferably $(0.65 < x < 0.85)$, and more preferably $(0.70 < x < 0.80)$. When the value of x is smaller than the foregoing range, the discharge capacity of the positive electrode active material is reduced. When the value of x is larger than the foregoing range, the stability of the crystal structure of the complex oxide particle is lowered, thereby causing a lowering of the capacity of the positive electrode active material by repetition of charge and discharge and a lowering of the safety.

The range of y is, for example, $(0.10 < y < 0.40)$, preferably $(0.15 < y < 0.35)$, and more preferably $(0.20 < x < 0.30)$. When the value of y is smaller than the foregoing range, the stability of the crystal structure of the complex oxide particle is lowered, thereby causing a lowering of the capacity of the positive electrode active material by repetition of charge and discharge and a lowering of the safety. When the value of y is larger than the foregoing range, the discharge capacity of the positive electrode active material is reduced.

The range of z is, for example, $(0.01 < z < 0.20)$, preferably $(0.02 < z < 0.15)$, and more preferably $(0.03 < z < 0.10)$. When the value of z is smaller than the foregoing range, the stability of the crystal structure of the complex oxide particle is lowered, thereby causing a lowering of the capacity of the positive electrode active material by repetition of charge and discharge and a lowering of the safety. When the value of z is larger than the foregoing range, the discharge capacity of the positive electrode active material is reduced.

This lithium complex oxide composed mainly of nickel is a lithium complex oxide for lithium ion secondary batteries, which is able to realize a high voltage and a high energy density substantially equal to those in a complex oxide composed mainly of cobalt. This lithium complex oxide has such an advantage that it is high in economy because a content of cobalt which is a material that is instable in natural resources and expensive is small. Also, this lithium complex oxide has such an advantage that the current capacity is large as compared with lithium cobaltate.

[Coating Layer]

The coating layer is a layer formed on the surface of the complex oxide particle composed mainly of nickel and contains an oxo acid and/or an oxo acid compound. Examples of the oxo acid include silicotungstic acid, phosphotungstic acid and phosphomolybdic acid. Examples of the oxo acid compound include ammonium metatungstate, ammonium paratungstate and ammonium silicotungstate. It should not be construed that the oxo acid and oxo acid compound are limited to those as exemplified above.

According to this coating layer, the acidity of the surface of the complex oxide particle composed mainly of nickel is increased. Therefore, the coating layer contributes to the dissolution of the Factor 2 of the foregoing Factor 1 and Factor 2 which are a common view as factors for the gas generation, and it may be considered that the formation of a carbonic acid gas can be suppressed.

This positive electrode active material is one in which a carbonic acid root contained in the complex oxide composed mainly of nickel is reduced. That is, though details of the manufacturing method are described later, this positive electrode active material can be, for example, obtained by cladding an oxo acid and/or an oxo acid compound on the surface of a complex oxide particle composed mainly of nickel and heat treating it and is one in which a carbonic acid root contained in the complex oxide composed mainly of nickel is reduced.

In the heat treatment, an oxo acid ion produced from the oxo acid and/or the oxo acid compound undergoes a substitution reaction with a part of the carbonic acid root remaining on the surface of the lithium complex oxide particle composed mainly of nickel, whereby a part of the carbonic acid root is released as a carbonic acid gas outside the system. According to this, a content of the carbonic acid root of the lithium complex oxide particle composed mainly of lithium is lowered, and following this, a reduction of the blister can be expected. It may be considered that this contributes to the dissolution of the Factor 1.

For example, the content of the carbonic acid root (content of the carbonic acid component) of the positive electrode active material is preferably not more than 0.15% by weight, more preferably not more than 0.10% by weight, and especially preferably not more than 0.05% by weight according to an analysis by the method described in the Japanese Industrial Standards JIS-R-9101.

[Particle Size]

An average particle size of the positive electrode active material is preferably 2.0 μm or more and not more than 50 μm. When the average particle size of the positive electrode active material is less than 2.0 μm, during pressing a positive electrode active material layer at the time of preparing a positive electrode, the positive electrode active material layer is separated. Also, since a surface area of the positive electrode active material increases, it is necessary to increase an addition amount of a conductive agent or a binder, and therefore, an energy density per unit weight tends to become small. On the other hand, when this average particle size exceeds 50 μm, there is a tendency that the particle penetrates through a separator, thereby causing a short circuit.

[Effect]

In the positive electrode active material according to the First Embodiment, the acidity of the surface of the complex oxide particle composed mainly of nickel is increased by the coating layer. According to this, when used in a nonaqueous electrolyte battery, an oxidation activity of the surface of the complex oxide particle in a charged state can be suppressed. According to this, the gas generation to be caused due to decomposition of a nonaqueous electrolytic solution component or the like can be suppressed.

Also, in the positive electrode active material according to the First Embodiment, the carbonic acid root contained in the lithium complex oxide particle composed mainly of nickel is reduced. According to this, the gas generation from the positive electrode active material itself can be suppressed.

2. Second Embodiment (Manufacturing Method of Positive Electrode Active Material)

Next, a manufacturing method of a positive electrode active material according to an embodiment is described. A manufacturing method of the positive electrode active material according the First Embodiment broadly includes the steps of cladding an oxo acid and/or an oxo acid compound on a complex oxide particle composed mainly of nickel; and heat treating the complex oxide particle composed mainly of nickel and having an oxo acid and/or an oxo acid compound cladded thereon.

The manufacturing method of the positive electrode active material according to the First Embodiment is to improve characteristics of the complex oxide particle composed mainly of nickel by, for example, subjecting a complex oxide particle composed mainly of nickel as prepared by a usual known technique to a surface treatment including the foregoing cladding step and heating step.

First of all, the manufacturing method of a lithium complex oxide particle composed mainly of nickel is hereunder described; and then, a cladding treatment of an oxo acid and/or an oxo acid compound on the lithium complex oxide particle and a heating treatment after the cladding treatment are successively described.

[Manufacturing Method of Lithium Complex Oxide Particle]

The lithium complex oxide particle composed mainly of nickel can be manufactured by a known technique. For example, a lithium complex oxide particle having an average composition represented by the formula (1) as described in the First Embodiment can be prepared by a known technique.

Specifically, for example, a nickel compound, a cobalt compound, an aluminum compound and a lithium compound and optionally, other compound of a substitution element or the like are dissolved in water, and a sodium hydroxide solution is added to the mixture while thoroughly stirring, thereby preparing a nickel-cobalt-aluminum complex coprecipitated hydroxide.

Subsequently, this nickel-cobalt-aluminum complex coprecipitated hydroxide is washed with water and dried, and the obtained precursor is baked. There can be thus prepared a lithium complex oxide particle composed mainly of nickel. If desired, lithium nickelate after baking may be pulverized.

Examples of a raw material of the nickel compound which can be used include inorganic compounds such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate and nickel thiocyanate; and organic compounds such as nickel oxalate and nickel acetate. Such a compound may be used singly or in admixture of two or more kinds thereof.

Examples of a raw material of the cobalt compound which can be used include inorganic compounds such as cobalt hydroxide, cobalt carbonate, cobalt nitrate, cobalt fluoride, cobalt chloride, cobalt bromide, cobalt iodide, cobalt chlorate, cobalt perchlorate, cobalt bromate, cobalt iodate, cobalt oxide, cobalt phosphinate, cobalt sulfide, cobalt hydrogensulfide, cobalt sulfate, cobalt hydrogensulfate, cobalt thiocyanate, cobalt nitrite, cobalt phosphate, cobalt dihydrogenphosphate and cobalt hydrogencarbonate; and organic compounds such as cobalt oxalate and cobalt acetate. Such a compound may be used singly or in admixture of two or more kinds thereof.

Examples of a raw material of the aluminum compound which can be used include inorganic compounds such as aluminum hydroxide, aluminum nitrate, aluminum fluoride, aluminum chloride, aluminum bromide, aluminum iodide, aluminum perchlorate, aluminum oxide, aluminum sulfide, aluminum sulfate and aluminum phosphate; and organic compounds such as aluminum oxalate. Such a compound may be used singly or in admixture of two or more kinds thereof.

Examples of a raw material of the lithium compound which can be used include inorganic compounds such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate and lithium hydrogencarbonate; and organic compounds such as methyllithium, vinyllithium, isopropyllithium, butyllithium, phenyllithium, lithium oxalate and lithium acetate. Such a compound may be used singly or in admixture of two or more kinds thereof.

As to the lithium complex oxide particle composed mainly of nickel, a material which is usually available as the positive electrode active material can be used as a starting raw material. Also, as the case may be, a particle obtained by pulverizing a secondary particle using a ball mill, a triturator, etc. can be used.

[Cladding Step]

The lithium complex oxide particle composed mainly of nickel is subjected to a cladding treatment with an oxo acid and/or an oxo acid compound. For example, a secondary particle obtained by aggregating primary particles of a lithium complex oxide composed mainly of nickel and having a layered crystal is subjected to a cladding treatment with an oxo acid and/or an oxo acid compound. The cladding treatment is carried out by the following dry method.

[Dry Method]

The cladding treatment with an oxo acid and/or an oxo acid compound by a dry method is described. For cladding with an oxo acid and/or an oxo acid compound by a dry method, a known technique can be adopted.

Specifically, a dried lithium complex oxide particle and a dried particle of an oxo acid/or an oxo acid compound are used, and cladding is performed by a method by means of a manpower using a mortar, a method using a triturator, a method using a high-speed machine due to a high shear force for generating mechanical aggregation, or the like. A cladding amount of the oxo acid and/or the oxo acid compound is preferably 0.01 parts by weight or more and not more than 5.0 parts by weight, more preferably 0.02 parts by weight or more and not more than 3.0 parts by weight, and further preferably 0.03 parts by weight or more and not more than 1.0 part by weight based on 100 parts by weight of the complex oxide particle. When the cladding amount of the oxo acid and/or the oxo acid compound is smaller than the foregoing range, it may be impossible to obtain an effect for suppressing the gas generation in the positive electrode active material. On the other hand, when the cladding amount of the oxo acid and/or the oxo acid compound is larger than the foregoing range, the discharge capacity of the positive electrode active material is reduced, and therefore, such is not preferable.

[Heat Treatment]

Next, the positive electrode active material according to the First Embodiment can be obtained by baking the lithium complex oxide particle having been subjected to a cladding treatment through a heat treatment. The lithium complex oxide particle after the heat treatment may be subjected to particle size adjustment by means of a light pulverization or classification operation or the like, if desired.

In the heat treatment, an oxo acid ion is produced from the oxo acid and/or the oxo acid compound. This oxo acid ion diffuses into the surface of the lithium complex oxide particle composed mainly of nickel and the bulk, thereby advancing a lowering of the basicity of the surface of the lithium complex oxide particle composed mainly of nickel. Then, a substitution reaction with the carbonic acid root of the lithium complex oxide particle is partially advanced, whereby the carbonic acid root is released as a carbonic acid gas outside the system. According to this, the content of the carbonic acid root of the lithium complex oxide composed mainly of nickel can be lowered.

[Heat Treatment Temperature]

In the heat treatment, an optimal temperature range of the heating temperature is preferably 150° C. or higher and not higher than 1,200° C., more preferably 200° C. or higher and not higher than 1,100° C., and further preferably 250° C. or higher and not higher than 1,000° C.

When the heating temperature is lower than the foregoing optimal temperature range, the reaction for producing an oxo acid ion from the oxo acid and/or the oxo acid compound is not thoroughly advanced. Furthermore, it may be impossible to thoroughly advance a diffusion reaction in which the produced oxo acid ion diffuses into the surface of the lithium complex oxide particle composed mainly of nickel and the bulk. Furthermore, it may be impossible to thoroughly advance a substitution reaction of the oxo acid and/or the oxo acid compound with the carbonic acid root contained in the complex oxide composed mainly of nickel.

On the other hand, where the heating temperature is higher than the foregoing optimal temperature range, the crystal structure of the lithium complex oxide composed mainly of nickel becomes instable, and following this, a tendency of causing a lowering of the discharge capacity becomes remarkable. Furthermore, in view of the fact that the surface concentration of a residual component of the oxo acid and/or the oxo acid compound is lowered, it becomes difficult to advance a lowering of the basicity of the surface of the lithium complex oxide particle. Moreover, an organic component of a nonaqueous electrolytic solution or the like is oxidized by a strong oxidizing power of the positive electrode active material in a charged state, whereby a function to suppress the gas generation mechanism of producing a carbonic acid gas (Factor 2) is lowered.

In the light of the above, the content of the carbonic acid root of the lithium complex oxide composed mainly of nickel can be lowered by the cladding treatment with the oxo acid and/or the oxo acid compound and the continuous heat treatment after cladding. The content of the carbonic acid root to be attained is preferably not more than 0.15% by weight, more preferably not more than 0.10% by weight, and further preferably not more than 0.05% by weight. The content of the carbonic acid root (content of the carbonic acid component) can be measured by the AGK method described in the Japanese Industrial Standards JIS-R-9101. When used in a battery, what the content of the carbonic acid root is lowered is effective for reducing the gas generation in the inside of the battery.

[Atmosphere of Heat Treatment]

In the heat treatment, as to the atmosphere condition, an oxidative atmosphere which is usually employed for the preparation of lithium nickelate is preferable; and it is desirable to carry out the heat treatment in an oxygen atmosphere.

The positive electrode active material according to the First Embodiment is obtained by subjecting the lithium complex oxide particle composed mainly of nickel to the foregoing cladding treatment step and heat treatment step. The positive electrode active material according to the First Embodiment, which meets the definition of the discharge capacity and the definition of the acidity, can be obtained by adjusting the amount of the cladding material in the cladding treatment step and adjusting conditions in the heat treatment step, such as a heating temperature and a heating time.

<Effect>

In the manufacturing method of a positive electrode active material according to the Second Embodiment, a treatment of cladding the surface of a lithium complex oxide composed mainly of nickel with an oxo acid and/or an oxo acid compound is carried out. According to this, a lowering of the basicity of the surface of the lithium complex oxide composed mainly of nickel is advanced. According to this, an oxidation activity of the surface of the lithium complex oxide particle composed mainly of nickel in a charged state can be suppressed. Accordingly, the gas generation to be caused due to decomposition of a nonaqueous electrolytic solution or the like can be suppressed.

Also, in the manufacturing method of a positive electrode active material according to the Second Embodiment, a part of the carbonic acid root remaining on the surface of the positive electrode active material is reduced by the cladding treatment with an oxo acid and/or an oxo acid compound and the subsequent heat treatment. According to this, the gas generation from the positive electrode active material itself can be suppressed.

3. Third Embodiment (First Example of Nonaqueous Electrolyte Battery)

FIG. 1 is a perspective view showing a configuration example of a nonaqueous electrolyte battery according to the Third Embodiment. This nonaqueous electrolyte battery is, for example, a nonaqueous electrolyte secondary battery. This nonaqueous electrolyte battery has a configuration in which a wound electrode body 10 having a positive electrode lead 11 and a negative electrode lead 12 installed therein is housed in the inside of an exterior member 1 in a film form and has a flat shape.

The positive electrode lead 11 and the negative electrode lead 12 are, for example, in a strip form and are led out from the inside toward the outside of the exterior member 1 in, for example, the same direction, respectively. The positive electrode lead 11 is, for example, constituted of a metal material such as aluminum (Al), and the negative electrode lead 12 is, for example, constituted of a metal material such as nickel (Ni).

The exterior member 1 is, for example, a laminated film having a structure in which an insulating layer, a metal layer and an outermost layer are laminated in this order and stuck to each other by means of lamination processing or the like. In the exterior member 1, for example, respective outer peripheries are brought into intimate contact with each other by means of fusion or with an adhesive while making the side of the insulating layer inward.

The insulating layer is, for example, constituted of a polyolefin resin such as polyethylene, polypropylene, modified polyethylene, modified polypropylene and copolymers thereof. This is because the moisture permeability can be made low, and excellent air tightness can be revealed. The metal layer is constituted of aluminum, stainless steel, nickel, iron or the like in a foil form or a plate form. The outermost layer may be, for example, constituted of the same resin as that in the insulating layer or may be constituted of nylon or the like. This is because the strength against breakage, piercing or the like can be increased. The exterior member 1 may be provided with other layer than the insulating layer, the metal layer and the outermost layer.

A contact film 2 is inserted between the exterior member 1 and each of the positive electrode lead 11 and the negative electrode lead 12 for the purpose of enhancing adhesion between each of the positive electrode lead 11 and the negative electrode lead 12 and the inside of the exterior member 1, thereby preventing invasion of the outside air from occurring. The contact film 2 is constituted of a material having adhesion to each of the positive electrode lead 11 and the negative electrode lead 12. For example, in the case where each of the positive electrode lead 11 and the negative electrode lead 12 is constituted of the foregoing metal material, it is preferable that each of the positive electrode lead 11 and the negative electrode lead 12 is constituted of a polyolefin resin such as polyethylene, polypropylene, modified polyethylene and modified polypropylene.

Figure 2:
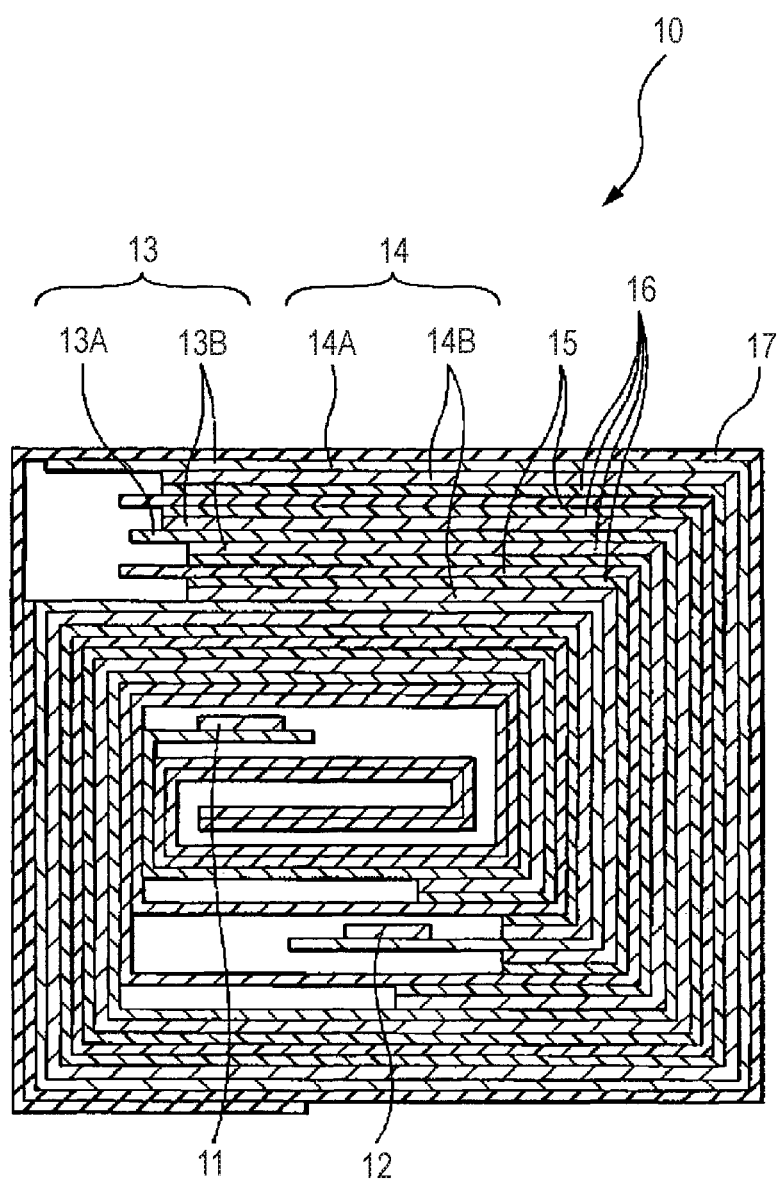
FIG. 2 is a sectional view along an II-II line of a wound electrode body shown in FIG. 1.

FIG. 2 is a sectional view along an II-II line of the wound electrode body 10 shown in FIG. 1. In the wound electrode body 10, a positive electrode 13 and a negative electrode 14 are laminated via a separator 15 and an electrolyte 16 and wound, and an outermost peripheral part of the wound electrode body 10 is protected by a protective tape 17.

The positive electrode 13 includes, for example, a positive electrode collector 13A and a positive electrode active material layer 13B provided on the both surfaces of this positive electrode collector 13A. The positive electrode collector 13A is, for example, constituted of a metal foil such as an aluminum foil.

The positive electrode active material layer 13B contains the foregoing positive electrode active material according to the First Embodiment. Also, the positive electrode active material layer 13B further contains a conductive assistant such as a carbon material and a binder such as polyvinylidene fluoride and polytetrafluoroethylene.

Similar to the positive electrode 13, the negative electrode 14 includes, for example, a negative electrode collector 14A and a negative electrode active material layer 14B provided on the both surfaces of this negative electrode collector 14A. The negative electrode collector 14A is, for example, constituted of a metal foil such as a copper foil.

The negative electrode active material layer 14B is, for example, constituted so as to contain, as a negative electrode active material, any one kind or two or more kinds of negative electrode materials capable of intercalating and deintercalating lithium. If desired, the negative electrode active material layer 14B may contain a conductive assistant and a binder.

Examples of the negative electrode material capable of intercalating and deintercalating lithium include carbon materials such as graphite, hardly graphitized carbon and easily graphitized carbon. Such a carbon material may be used singly or in admixture of two or more kinds thereof. Also, a mixture of two or more kinds of carbon materials having a different average particle size from each other may be used.

Also, examples of the negative electrode material capable of intercalating and deintercalating lithium include materials containing, as a constituent element, a metal element or a semi-metal element capable of forming an alloy together with lithium. Specific examples thereof include a simple substance, an alloy or a compound of a metal element capable of forming an alloy together with lithium; a simple substance, an alloy or a compound of a semi-metal element capable of forming an alloy together with lithium; and a material having one or two or more kinds of a phase in at least a part thereof.

Examples of such a metal element or semi-metal element include tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Above all, a metal element or a semi-metal element belonging to the Group 14 of the long form of the periodic table is preferable; and silicon (Si) and tin (Sn) are especially preferable. This is because silicon (Si) and tin (Sn) have large capability to intercalate and deintercalate lithium and are able to obtain a high energy density.

Examples of alloys of silicon (Si) include alloys containing, as a second constituent element other than silicon (Si), at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Examples of alloys of tin include alloys containing, as a second constituent element other than tin (Sn), at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of silicon (Si) or compounds of tin (Sn) include compounds containing oxygen (O) or carbon (C), and these compounds may contain the foregoing second constituent element in addition to silicon (Si) or tin (Sn).

As the separator 15, any material is useful so far as it is chemically stable against the positive electrode active material, the negative electrode active material or the solvent and does not have electrical conductivity. Examples thereof include a nonwoven fabric of a polymer, a porous film and a material obtained by forming glass or ceramic fibers into a paper-like state, and a plurality of these materials may be laminated and used. In particular, it is preferable to use a porous polyolefin film, and this may be compounded with a heat-resistant material made of polyimide, glass or ceramic fibers and used.

The electrolyte 16 contains an electrolytic solution and a holding material containing a polymer compound capable of holding this electrolytic solution therein and is formed in a so-called gel state. The electrolytic solution contains an electrolyte salt and a solvent for dissolving this electrolyte salt therein. Examples of the electrolyte salt include lithium salts such as $LiPF_6$, $LiClO_4$, $LiBF_4$, $LiN(SO_2CF_3)_2$, $LiN(SO_2C_2F_5)_2$ and $LiAsF_6$. The electrolyte salt may be used singly or in admixture of two or more kinds thereof.

Examples of the solvent include nonaqueous solvents, for example, lactone based solvents such as γ-butyrolactone, γ-valerolactone, δ-valerolactone and ε-caprolactone; carbonate based solvents such as ethylene carbonate, propylene carbonate, butylene carbonate, vinylene carbonate, dimethyl carbonate, ethyl methyl carbonate and diethyl carbonate; ether based solvents such as 1,2-dimethoxyethane, 1-ethoxy-2-methoxyethane, 1,2-diethoxyethane, tetrahydrofuran and 2-methyltetrahydrofuran; nitrile based solvents such as acetonitrile; sulfolane based solvents; phosphoric acids; phosphate solvents; pyrrolidones; and the like. The solvent may be used singly or in admixture of two or more kinds thereof.

Also, it is preferable that the solvent contains a compound obtained by fluorinating a part or the whole of hydrogens of a cyclic ester or a chain ester. As such a fluorinated compound, it is preferable to use difluoroethylene carbonate (4,5-difluoro-1,3-dioxolan-2-one). This is because even in the case where the negative electrode 14 containing, as a negative electrode active material, a compound of silicone (Si), tin (Sn), germanium (Ge) or the like is used, a charge and discharge cycle characteristic can be enhanced, and in particular, difluoroethylene carbonate is excellent in an effect for improving the cycle characteristic.

Any material is useful as the polymer compound so far as it is gelated upon absorbing the solvent therein. Examples thereof include fluorine based polymer compounds such as polyvinylidene fluoride and a copolymer of vinylidene fluoride and hexafluoropropylene; ether based polymer compounds such as polyethylene oxide and a crosslinked material containing polyethylene oxide; and compounds containing, as a repeating unit, polyacrylonitrile, polypropylene oxide or polymethyl methacrylate. The polymer compound may be used singly or in admixture of two or more kinds thereof.

In particular, from the standpoint of oxidation-reduction stability, fluorine based polymer compounds are desirable; and above all, a copolymer containing, as components, vinylidene fluoride and hexafluoropropylene is preferable. Furthermore, this copolymer may contain, as a component, a monoester of an unsaturated dibasic acid such as monomethyl maleate, a halogenated ethylene such as trifluorochloroethylene, a cyclic carbonate of an unsaturated compound such as vinylene carbonate, an epoxy group-containing acryl vinyl monomer or the like. This is because higher characteristics are obtainable.

[Manufacturing Method of Nonaqueous Electrolyte Battery]

This nonaqueous electrolyte battery can be, for example, manufactured in the following manner. First of all, a precursor solution containing an electrolytic solution, a polymer compound and a mixed solvent is coated on each of the positive electrode 13 and the negative electrode 14, and the mixed solvent is volatilized off to form the electrolyte 16. Thereafter, the positive electrode lead 11 is installed in an end of the positive electrode collector 13A by means of welding, and the negative electrode lead 12 is also installed in an end of the negative electrode collector 14A by means of welding.

Subsequently, the positive electrode 13 and the negative electrode 14 on each of which is formed the electrolyte 16 are laminated via the separator 15 to form a laminate; this laminate is then wound in the longitudinal direction; and the protective tape 17 is allowed to adhere to the outermost peripheral part to form the wound electrode body 10. Finally, for example, the wound electrode body 10 is interposed into the exterior member 1, and the outer edges of the exterior member 1 are brought into intimate contact with each other by means of heat fusion or the like, thereby enclosing the wound electrode body 10 therein. On that occasion, the contact film 2 is inserted between each of the positive electrode lead 11 and the negative electrode lead 12 and the exterior member 1. According to this, the nonaqueous electrolyte battery shown in FIGS. 1 and 2 is completed.

Also, this nonaqueous electrolyte battery may be prepared in the following manner. First of all, as described previously, the positive electrode 13 and the negative electrode 14 are prepared; the positive electrode lead 11 and the negative electrode lead 12 are installed in the positive electrode 13 and the negative electrode 14, respectively; the positive electrode 13 and the negative electrode 14 are then laminated via the separator 15 and wound; and the protective tape 17 is allowed to adhere to the outermost peripheral part, thereby forming a wound body as a precursor of the wound electrode body 10. Subsequently, this wound body is interposed into the exterior member 1, and the outer edges exclusive of one side are subjected to heat fusion to form a bag, which is then housed in the inside of the exterior member 1. Subsequently, an electrolyte composition containing an electrolytic solution, a monomer as a raw material of a polymer compound, a polymerization initiator and optionally, other materials such as a polymerization inhibitor is prepared and injected into the inside of the exterior member 1.

Figure 3:
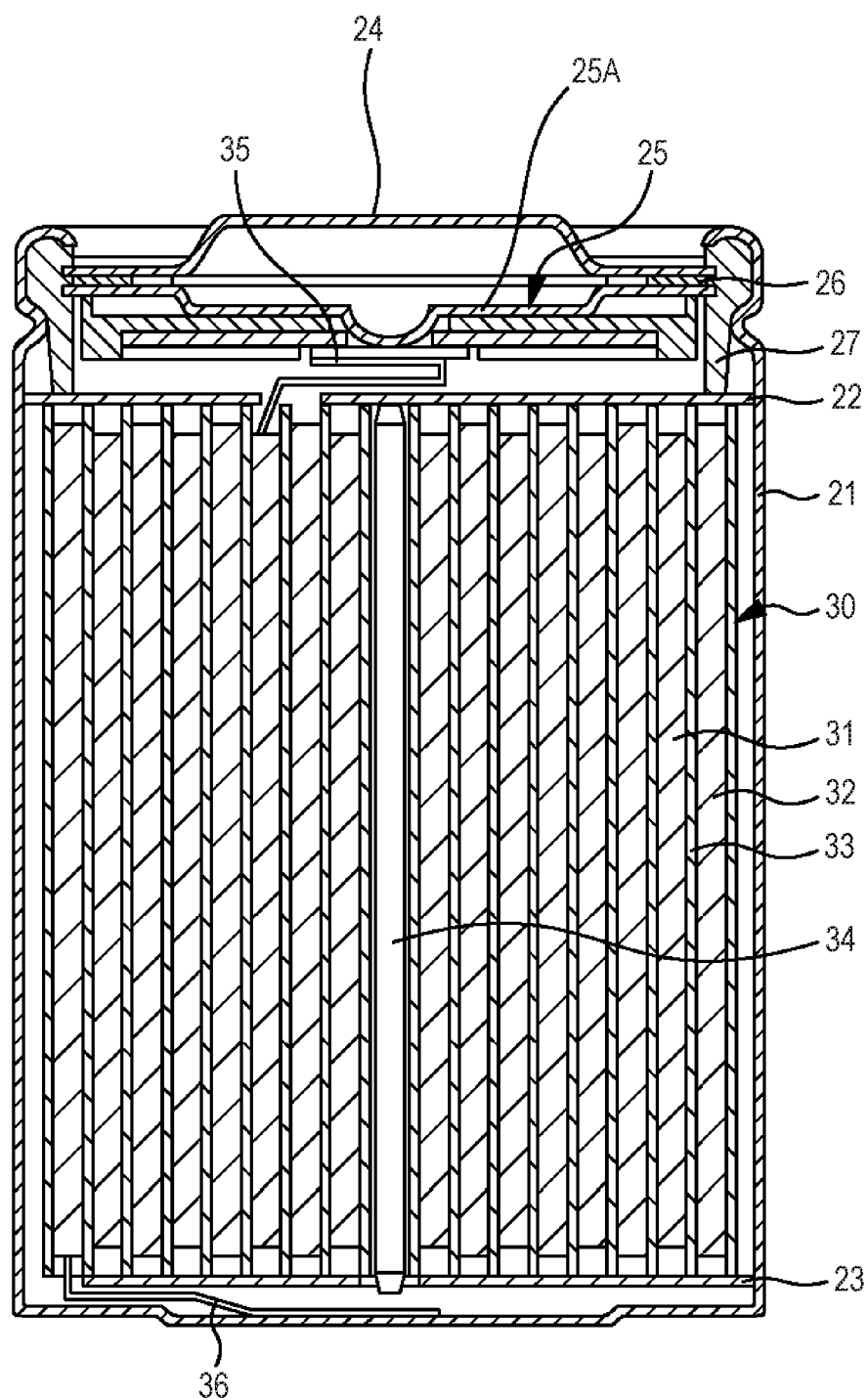
FIG. 3 is a sectional view showing a configuration example of a nonaqueous electrolyte battery according to an embodiment.
Figure 4:
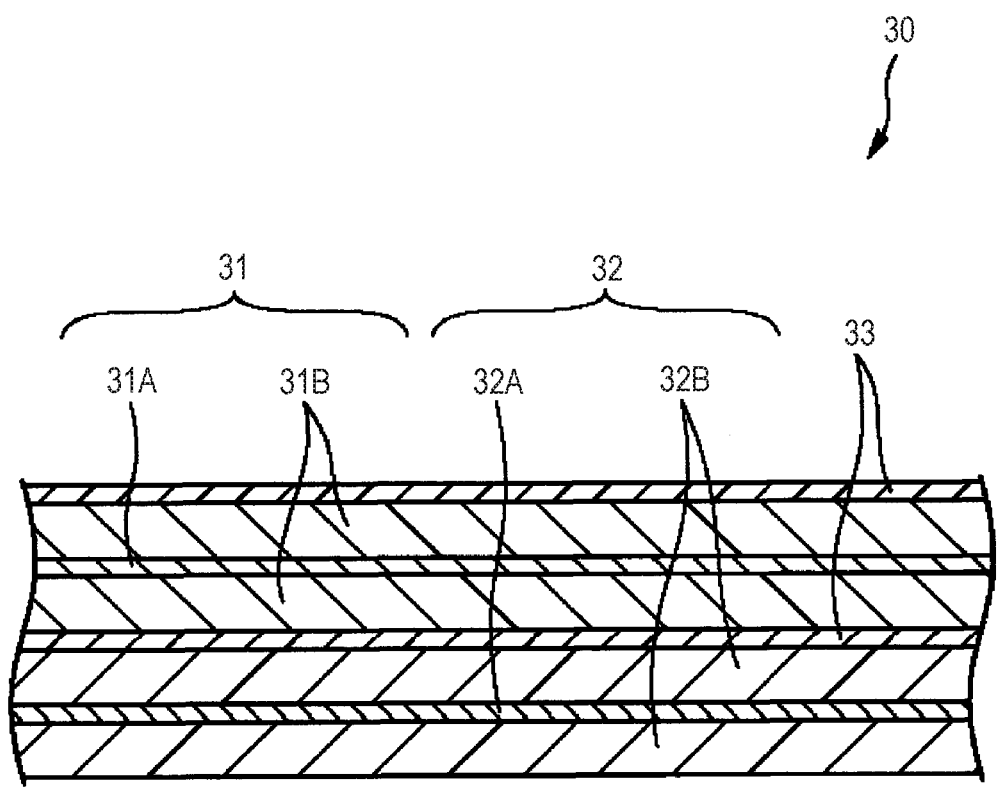
FIG. 4 is a sectional view showing enlargedly a part of a wound electrode body shown in FIG. 3.

After the electrolyte composition is injected, an opening of the exterior member 1 is hermetically sealed by means of heat fusion in a vacuum atmosphere. Subsequently, the monomer is polymerized upon heating to form a polymer compound, thereby forming the gel electrolyte 16; and a nonaqueous electrolyte battery shown in FIGS. 3 and 4 is assembled.

[Effect]

According to the Third Embodiment, the positive electrode active material according to the foregoing First Embodiment is used for the positive electrode active material. According to this configuration, the gas generation of the electrolytic solution can be suppressed, and the blister of a battery can be suppressed.

4. Fourth Embodiment (Second Example of Nonaqueous Electrolyte Battery)

Next, the Fourth Embodiment is described. The nonaqueous electrolyte battery according to the Fourth Embodiment is one obtained by using an electrolytic solution in place of the gel electrolyte 16 in the nonaqueous electrolyte battery according to the Third Embodiment. In that case, the electrolytic solution is impregnated in the separator 15. As the electrolytic solution, an electrolytic solution the same as that in the foregoing Third Embodiment is useful.

The nonaqueous electrolyte battery having such a configuration can be, for example, prepared in the following manner. First of all, the positive electrode 13 and the negative electrode 14 are prepared; the positive electrode lead 11 and the negative electrode lead 12 are installed in the positive electrode 13 and the negative electrode 14, respectively; the positive electrode 13 and the negative electrode 14 are then laminated via the separator 15 and wound; and the protective tape 17 is allowed to adhere to the outermost peripheral part, thereby preparing a wound electrode body having a configuration in which the electrolyte 16 is omitted in the configuration of the wound electrode body 10. This wound electrode body is interposed into the exterior member 1, the electrolytic solution is then injected, and the exterior member 1 is hermetically sealed.

[Effect]

According to the Fourth Embodiment, the same effect as that in the foregoing Third Embodiment is obtainable. That is, by using the positive electrode active material according to the foregoing First Embodiment as the positive electrode active material, the gas generation of the electrolytic solution can be suppressed, and the blister of a battery can be suppressed.

5. Fifth Embodiment (Third Example of Nonaqueous Electrolyte Battery)

Next, a configuration of the nonaqueous electrolyte battery according to the Fifth Embodiment is described with reference to FIGS. 3 and 4. FIG. 3 shows a configuration of the nonaqueous electrolyte battery according to the Fifth Embodiment. This nonaqueous electrolyte battery is of a so-called cylinder type and has a wound electrode body 30 in which a strip-shaped positive electrode 31 and a strip-shaped negative electrode 32 are wound via a separator 33 in the inside of a substantially hollow columnar battery can 21. The separator 33 is impregnated with an electrolytic solution which is a liquid electrolyte. The battery can 21 is made of, for example, nickel (Ni)-plated iron (Fe), and one end thereof is closed, with the other end being opened. A pair of insulating plates 22 and 23 is disposed in the inside of the battery can 21 vertically against the wound peripheral surface so as to interpose the wound electrode body 30 therebetween.

In the open end of the battery can 21, a battery lid 24 is installed by caulking with a safety valve mechanism 25 and a positive temperature coefficient element (PTC element) 26 provided in the inside of this battery lid 24 via a gasket 27, and the inside of the battery can 21 is hermetically sealed. The battery lid 24 is made of, for example, a material the same as that in the battery can 21. The safety valve mechanism 25 is electrically connected to the battery lid 24 via the positive temperature coefficient element 26. In the case where the internal pressure of the battery reaches a fixed value or more due to an internal short circuit, heating from the outside or the like, a disc plate 25A is reversed, whereby electrical connection between the battery lid 24 and the wound electrode body 30 is disconnected. When the temperature rises, the positive temperature coefficient element 26 controls a current due to an increase of a resistance value, whereby abnormal heat generation to be caused due to a large current is prevented from occurring. The gasket 27 is made of, for example, an insulating material, and asphalt is coated on the surface thereof.

For example, the wound electrode body 30 is wound centering on a center pin 34. A positive electrode lead 35 made of aluminum (Al), etc. is connected to the positive electrode 31 of the wound electrode body 30; and a negative electrode lead 36 made of nickel (Ni), etc. is connected to the negative electrode 32. The positive electrode lead 35 is welded to the safety valve mechanism 25, whereby it is electrically connected to the battery lid 24; and the negative electrode lead 36 is welded to the battery can 21, whereby it is electrically connected thereto.

FIG. 4 enlargedly shows a part of the wound electrode body 30 shown in FIG. 3. The wound electrode body 30 is one in which the positive electrode 31 and the negative electrode 32 are laminated via the separator 33 and wound.

The positive electrode 31 includes, for example, a positive electrode collector 31A and a positive electrode active material layer 31B provided on the both surfaces of this positive electrode collector 31A. The negative electrode 32 includes, for example, a negative electrode collector 32A and a negative electrode active material layer 32B provided on the both surfaces of this negative electrode collector 32A. The configurations of the positive electrode collector 31A, the positive electrode active material layer 31B, the negative electrode collector 32A, the negative electrode active material layer 32B, the separator 33 and the electrolytic solution are the same as those of the positive electrode collector 13A, the positive electrode active material layer 13B, the negative electrode collector 14A, the negative electrode active material layer 14B, the separator 15 and the electrolytic solution in the foregoing Third Embodiment, respectively.

Next, the manufacturing method of the nonaqueous electrolyte battery according to the Fifth Embodiment is described.

The positive electrode 31 is prepared in the following manner. As described previously, the positive electrode active material layer 31B is formed on the positive electrode collector 31A, thereby obtaining the positive electrode 31. The forming method of the positive electrode active material layer 31B is the same as that described above, and therefore, its detailed description is omitted.

The negative electrode 32 is prepared in the following manner. First of all, a negative electrode active material and a binder are mixed to prepare a negative electrode mixture, and this negative electrode mixture is dispersed in a solvent such as N-methyl-2-pyrrolidone to form a negative electrode mixture slurry. Subsequently, this negative electrode mixture slurry is coated on the negative electrode collector 32A, and after drying the solvent, the resultant is subjected to compression molding by a roll press or the like, thereby forming the negative electrode active material layer 32B. There is thus obtained the negative electrode 32.

Subsequently, the positive electrode lead 35 is installed in the positive electrode collector 31A by means of welding or the like, and the negative electrode lead 36 is also installed in the negative electrode collector 32A by means of welding or the like. Thereafter, the positive electrode 31 and the negative electrode 32 are wound via the separator 33; a tip of the positive electrode lead 35 is welded to the safety valve mechanism 25. A tip of the negative electrode lead 36 is also welded to the battery can 21, thereby housing the wound positive electrode 31 and negative electrode 32 in the inside of the battery can 21 while being interposed between the pair of the insulating plates 22 and 23. After housing the positive electrode 31 and the negative electrode 32 in the inside of the battery can 21, the electrolyte is injected into the inside of the battery can 21 and impregnated in the separator 33. Thereafter, the battery lid 24, the safety valve mechanism 25 and the positive temperature coefficient element 26 are fixed to the open end of the battery can 21 via the gasket 27 by caulking There is thus prepared the nonaqueous electrolyte battery shown in FIG. 3.

[Effect]

In the nonaqueous electrolyte battery according to the Fifth Embodiment, by using the positive electrode active material according to the First Embodiment, the gas generation can be suppressed, and a breakage to be caused due to an increase of the internal pressure can be prevented from occurring.

6. Sixth Embodiment (Second Example of Positive Electrode Active Material)

First of all, in order to make it easy to understand an embodiment, the technical background relative to a positive electrode active material according to the Sixth Embodiment is described.

A lithium complex oxide composed mainly of nickel, for example, lithium nickelate ($LiNiO_2$), a nickel based lithium complex oxide obtained by substituting a part of nickel of lithium nickelate with other metal, etc. can be used as a positive electrode active material for nonaqueous electrolyte batteries. Also, a lithium complex oxide composed mainly of cobalt, for example, lithium cobaltate ($LiCoO_2$), a cobalt based lithium complex oxide obtained by substituting a part of cobalt of lithium cobaltate with other metal, etc. can be used as a positive electrode active material for nonaqueous electrolyte batteries.

As compared with the lithium complex oxide composed mainly of cobalt, the lithium complex oxide composed mainly of nickel is high in economy because a content of cobalt which is a material that is instable in natural resources and expensive is small. Furthermore, as compared with the lithium complex oxide composed mainly of cobalt, the lithium complex oxide composed mainly of nickel has such an advantage that its capacity is large, and it is desirable to more increase this advantage.

On the other hand, in a secondary battery using the lithium complex oxide composed mainly of nickel as a positive electrode active material, a gas is easily generated in the inside of the battery. Then, there is encountered such a problem that an internal pressure rises following this gas generation, and in particular, in a battery using a laminated film for the exterior, the blister of the battery is easily caused. Thus, it is demanded to solve such a problem.

The positive electrode active material according to the Sixth Embodiment is to cope with a demand to solve the foregoing problem and has such an effect that by modifying a lithium complex oxide composed mainly of nickel, the gas generation to be caused when used for batteries is reduced.

[Constitution of Positive Electrode Active Material]

A constitution of the positive electrode active material according to the Sixth Embodiment is described. The positive electrode active material according to the Sixth Embodiment is one in which a coating layer containing a heteropoly acid and/or a heteropoly acid compound is formed on at least a part of the surface of a particle of a lithium complex oxide composed mainly of nickel.

[Lithium Complex Oxide Particle]

The lithium complex oxide particle is a particle of a lithium complex oxide containing, as constituent elements, lithium (Li) and nickel (Ni). This lithium complex oxide is one composed mainly of nickel. The terms "composed mainly of nickel" as referred to herein mean that among metal elements (exclusive of lithium) constituting the lithium complex oxide, the nickel component is contained in the largest amount.

This lithium complex oxide particle may be any of a primary particle or a secondary particle obtained by aggregating plural primary particles. This lithium complex oxide is one in which the nickel component is contained in a larger amount than the cobalt component, and its average composition is, for example, represented by the following formula (1).

$$Li_aNi_xCo_yAl_zO_2 \qquad (1)$$

In the formula (1), nickel (Ni) is able to be substituted with one or two or more kinds of metal elements selected from the group consisting of manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La) and cerium (Ce) within the range of not more than 0.1 of Ni when the amount of the whole of Ni is defined to be 1. Also, in the formula (1), a, x, y and z are values falling within the ranges of $(0.20 \leq a \leq 1.40)$, $(0.60<x<0.90)$, $(0.10<y<0.40)$ and $(0.01<z<0.20)$, respectively; and x, y and z have the relationship of $(x+y+z)=1$.

Here, in the formula (1), the range of a is, for example, $(0.20 \leq a \leq 1.40)$. When the value of a is smaller than the foregoing range, a layered rock salt structure of the basic crystal structure of the lithium complex oxide collapses, whereby recharge becomes difficult, and the capacity is significantly lowered. When the value of a is larger than the foregoing range, lithium diffuses outside the foregoing complex oxide particle, whereby not only the control of the basicity in a subsequent treatment step is impaired, but hindrance of the acceleration of gelation during kneading of a positive electrode paste is finally caused.

The lithium complex oxide represented by the foregoing formula (1) is one which may contain lithium excessively as compared with the existing lithium complex oxides. That is, the value of a showing the lithium composition of the lithium complex oxide represented by the formula (1) may be larger than 1.2. Here, the value of 1.2 is one disclosed as the lithium composition of the existing lithium complex oxides of this type, and the same action and effect as in the present application are obtainable through the same crystal structure as in the case of a=1 (see, for example, JP-A-2008-251434 which is a prior application by the same assignee of the present application).

Even when the value of a showing the lithium composition of the lithium complex oxide represented by the formula (1) is larger than 1.2, the crystal structure of the lithium complex oxide is the same as in the case where the value of a is not more than 1.2. Also, even if the value of a showing the lithium composition in the formula (1) is larger than 1.2, when the value of a is not more than 1.40, the chemical state of a transition metal constituting the lithium complex oxide in the oxidation-reduction reaction following the charge and discharge is not significantly changed as compared with the case where the value of a is not more than 1.2.

The range of x is, for example, $(0.60<x<0.90)$, preferably $(0.65<x<0.85)$, and more preferably $(0.70<x<0.80)$. When the value of x is smaller than the foregoing range, the discharge capacity of the positive electrode active material is reduced. When the value of x is larger than the foregoing range, the stability of the crystal structure of the complex oxide particle is lowered, thereby causing a lowering of the capacity of the positive electrode active material by repetition of charge and discharge and a lowering of the safety.

The range of y is, for example, ($0.10<y<0.40$), preferably ($0.15<y<0.35$), and more preferably ($0.20<x<0.30$). When the value of y is smaller than the foregoing range, the stability of the crystal structure of the complex oxide particle is lowered, thereby causing a lowering of the capacity of the positive electrode active material by repetition of charge and discharge and a lowering of the safety. When the value of y is larger than the foregoing range, the discharge capacity of the positive electrode active material is reduced.

The range of z is, for example, ($0.01<z<0.20$), preferably ($0.02<z<0.15$), and more preferably ($0.03<z<0.10$). When the value of z is smaller than the foregoing range, the stability of the crystal structure of the complex oxide particle is lowered, thereby causing a lowering of the capacity of the positive electrode active material by repetition of charge and discharge and a lowering of the safety. When the value of z is larger than the foregoing range, the discharge capacity of the positive electrode active material is reduced.

This lithium complex oxide composed mainly of nickel is a lithium complex oxide for lithium ion secondary batteries, which is able to realize a high voltage and a high energy density substantially equal to those in a complex oxide composed mainly of cobalt. This lithium complex oxide has such an advantage that it is high in economy because a content of cobalt which is a material that is instable in natural resources and expensive is small. Also, this lithium complex oxide has such an advantage that the current capacity is large as compared with lithium cobaltate.

[Coating Layer]

The coating layer is a layer formed on at least a part of the surface of the complex oxide particle and contains a heteropoly acid and/or a heteropoly acid compound. The heteropoly acid as referred to herein is a condensate of two or more kinds of central ion-containing oxo acids. In this heteropoly acid or heteropoly acid compound, a heteropoly acid ion thereof has an Anderson structure, a Keggin structure or a Dawson structure.

Examples of a poly atom of the heteropoly acid or heteropoly acid compound include Mo, W, Nb and V. The heteropoly acid or heteropoly acid compound may also be one obtained by substituting a part of the foregoing poly atom with Ti, Cr, Mn, Fe, Co, Ni, Cu, Zn, Ga, Zr, Tc, Rh, Cd, In, Sn, Ta, Re, Tl or Pb.

Examples of a hetero atom of the heteropoly acid or heteropoly acid compound include B, Al, Si, P, Cr, Mn, Fe, Co, Ni, Cu, Zn, Ge or As. Also, a part of the foregoing hetero atom may be substituted with H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U or Np.

Examples of the heteropoly acid include heteropolytungstic acids such as phosphotungstic acid and silicotungstic acid; and heteropolymolybdic acids such as phosphomolybdic acid. Examples of the heteropoly acid compound include heteropolytungstic acid compounds such as sodium silicotungstate, sodium phosphotunstate and ammonium phosphotungstate. Also, examples of the heteropoly acid compound include heteropolymolybdic acids such as sodium phosphomolybdate and ammonium phosphomolybdate.

The heteropoly acid or heteropoly acid compound is preferably one having high acidity. From the viewpoint of practical availability and the viewpoint of obtained effects, heteropolytungstic acids, heteropolytungstic acid compounds, heteropolymolybdic acids and heteropolymolybdic acid compounds are preferable as the heteropoly acid or heteropoly acid compound. Also, from the same viewpoints, the hetero atom of the heteropoly acid or heteropoly acid compound is preferably Si or P.

At the time of charge of the battery, a component to be oxidized in the electrolytic solution is oxidized by an oxidizing action of the heteropoly acid ion and synergistic oxidation potential and current therewith, whereby a coating layer containing the heteropoly acid ion as a constituent element. This coating layer prevents high-level oxidation of an organic material of the electrolytic solution or the like and functions to prevent the production of a carbonic acid gas or the like.

That is, it may be considered that this coating layer chiefly contributes to the dissolution of the Factor 2' of the following Factor l' and Factor 2' which are a common view as factors for the gas generation, whereby the gas generation can be suppressed.

(Factor 1')

A carbonic acid root contained in the complex oxide particle produces a carbonic acid gas by an acid component derived from a nonaqueous electrolytic solution.

(Factor 2')

An organic component of a nonaqueous electrolytic solution or the like is oxidized by a strong oxidizing power of the positive electrode active material in a charged state, thereby producing a carbonic acid gas or carbon monoxide.

The fact that the Factor 2' but not the Factor 1' is chiefly dissolved by this coating layer is based on the following thought. That is, taking into account the volumetric size of the heteropoly acid ion, it may be impossible to effectively substitute the carbonic acid root remaining exposed on the surface of the particle of the lithium complex oxide composed mainly of nickel. Furthermore, the heteropoly acid ion hardly diffuses into a surface-adjacent layer bulk of the complex oxide particle, and it may be considered that it is extremely difficult to effectively substitute the carbonic acid root contained in this surface-adjacent layer bulk.

This positive electrode active material subordinately dissolves the Factor 1', too. That is, this positive electrode active material is one in which the carbonic acid root contained in the lithium complex oxide composed mainly of nickel is reduced. Though details of the manufacturing method are described later, this positive electrode active material is, for example, obtained by cladding a heteropoly acid and/or a heteropoly acid compound on the surface of a lithium complex oxide particle composed mainly of nickel and heat treating it.

In the heat treatment, the heteropoly acid ion produced from the heteropoly acid and/or the heteropoly acid compound diffuses onto the particle surface to cover the particle surface and undergoes a substitution reaction with a part of the carbonic acid root remaining on the surface of the lithium complex oxide composed mainly of nickel. Then, a part of the carbonic acid root contained in the lithium complex oxide composed mainly of nickel is released as a carbonic acid gas outside the system. According to this, a content of the carbonic acid root of the lithium complex oxide particle composed mainly of lithium is reduced, and therefore, the gas generation can be suppressed.

[Particle Size]

An average particle size of the positive electrode active material is preferably 2.0 μm or more and not more than 50 μm. When the average particle size of the positive electrode active material is less than 2.0 μm, during pressing a positive electrode active material layer at the time of preparing a positive electrode, the positive electrode active material layer is separated. Also, since a surface area of the positive electrode active material increases, it is necessary to increase an addition amount of a conductive agent or a binder, and therefore, an energy density per unit weight tends to become small. On the other hand, when this average particle size exceeds 50

μm, there is a tendency that the particle penetrates through a separator, thereby causing a short circuit.

[Effect]

In the positive electrode active material according to the Sixth Embodiment, when used in a nonaqueous electrolyte battery, an oxidation activity of the surface of the complex oxide particle in a charged state can be suppressed. According to this, the gas generation to be caused due to decomposition of a nonaqueous electrolytic solution component or the like can be suppressed.

Also, in the positive electrode active material according to the Sixth Embodiment, by cladding and heating the heteropoly acid and/or the heteropoly acid compound, the carbonic acid root contained in the lithium complex oxide particle composed mainly of nickel is reduced. According to this, the gas generation from the positive electrode active material itself can be suppressed.

7. Seventh Embodiment (Second Example of Manufacturing Method of Positive Electrode Active Material)

Next, a second example of a manufacturing method of a positive electrode active material according to an embodiment is described. In the following description, first of all, a manufacturing method of a lithium complex oxide particle composed mainly of nickel is described. Next, a cladding treatment of the lithium complex oxide particle with a heteropoly acid and/or a heteropoly acid compound and a heating treatment after the cladding treatment are successively described.

[Manufacturing Method of Lithium Complex Oxide Particle]

The lithium complex oxide particle composed mainly of nickel can be manufactured by a known technique. For example, a lithium complex oxide particle having an average composition represented by the formula (1) as described in the First Embodiment can be prepared by a known technique.

Specifically, for example, a nickel compound, a cobalt compound, an aluminum compound and a lithium compound and optionally, other compound of a substitution element or the like are dissolved in water, and a sodium hydroxide solution is added to the mixture while thoroughly stirring, thereby preparing a nickel-cobalt-aluminum complex coprecipitated hydroxide.

Subsequently, this nickel-cobalt-aluminum complex coprecipitated hydroxide is washed with water and dried, and the obtained precursor is baked. There can be thus prepared a lithium complex oxide particle composed mainly of nickel. If desired, lithium nickelate after baking may be pulverized.

Examples of a raw material of the nickel compound which can be used include inorganic compounds such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate and nickel thiocyanate; and organic compounds such as nickel oxalate and nickel acetate. Such a compound may be used singly or in admixture of two or more kinds thereof.

Examples of a raw material of the cobalt compound which can be used include inorganic compounds such as cobalt hydroxide, cobalt carbonate, cobalt nitrate, cobalt fluoride, cobalt chloride, cobalt bromide, cobalt iodide, cobalt chlorate, cobalt perchlorate, cobalt bromate, cobalt iodate, cobalt oxide, cobalt phosphinate, cobalt sulfide, cobalt hydrogensulfide, cobalt sulfate, cobalt hydrogensulfate, cobalt thiocyanate, cobalt nitrite, cobalt phosphate, cobalt dihydrogenphosphate and cobalt hydrogencarbonate; and organic compounds such as cobalt oxalate and cobalt acetate. Such a compound may be used singly or in admixture of two or more kinds thereof.

Examples of a raw material of the aluminum compound which can be used include inorganic compounds such as aluminum hydroxide, aluminum nitrate, aluminum fluoride, aluminum chloride, aluminum bromide, aluminum iodide, aluminum perchlorate, aluminum oxide, aluminum sulfide, aluminum sulfate and aluminum phosphate; and organic compounds such as aluminum oxalate. Such a compound may be used singly or in admixture of two or more kinds thereof.

Examples of a raw material of the lithium compound which can be used include inorganic compounds such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate and lithium hydrogencarbonate; and organic compounds such as methyllithium, vinyllithium, isopropyllithium, butyllithium, phenyllithium, lithium oxalate and lithium acetate. Such a compound may be used singly or in admixture of two or more kinds thereof.

As to the lithium complex oxide particle composed mainly of nickel, a material which is usually available as the positive electrode active material can be used as a starting raw material. Also, as the case may be, a particle obtained by pulverizing a secondary particle using a ball mill, a triturator, etc. can be used.

[Cladding Treatment]

Subsequently, the prepared lithium complex oxide particle composed mainly of nickel is subjected to a cladding treatment with a heteropoly acid and/or a heteropoly acid compound. For example, a secondary particle obtained by aggregating primary particles of a lithium complex oxide composed mainly of nickel is subjected to a cladding treatment with a heteropoly acid and/or a heteropoly acid compound.

The cladding treatment can be carried out by the following wet method or dry method.

[Wet Method]

An example of the cladding treatment by a wet method is hereunder described.

In an example of this wet method, first of all, the heteropoly acid and/or heteropoly acid compound as a cladding component is, for example, dissolved in a solvent such as an inorganic solvent, for example, water, etc. to prepare a solution. Subsequently, this solution is cladded on the heated lithium complex oxide particle composed mainly of nickel to remove the solvent within a short period of time, thereby depositing the cladding component on the surface of the complex oxide particle. The cladding treatment is thus carried out.

Cladding of the solution having a cladding component dissolved therein can be, for example, carried out by a method of spraying the solution onto the scattered complex oxide particle; or a method of dropping the solution onto the complex oxide particle; or the like.

In this example of the cladding method by a wet method, since the complex oxide particle is heated during cladding of the solution having a cladding component dissolved therein, the solvent in which the cladding component is dissolved can be removed within a short period of time, thereby depositing the cladding component on the surface of the complex oxide particle. It is preferable to regulate the heating temperature at a boiling point of the solution having a cladding component dissolved therein or higher.

In this example of the cladding treatment by a wet method, the solvent in which a heteropoly acid and/or a heteropoly acid compound is dissolved can be removed within a short period of time. Accordingly, it is possible to make the time for which the complex oxide particle comes into contact with the solvent contained in the solution extremely short.

In general, when a complex oxide particle comes into contact with a solvent, a lithium ion in the complex oxide particle elutes into the solvent. However, in this example of this cladding treatment by a wet method, the elution of the lithium ion is suppressed, whereby denaturation of the surface of the complex oxide particle and a lowering of the capacity of the positive electrode active material following this can be suppressed.

A cladding amount of the heteropoly acid and/or the heteropoly acid compound is preferably 0.01 parts by weight or more and not more than 10.0 parts by weight, more preferably 0.02 parts by weight or more and not more than 5.0 parts by weight, and further preferably 0.03 parts by weight or more and not more than 3.0 parts by weight based on 100 parts by weight of the complex oxide particle. The weight of the heteropoly acid is defined as a value obtained by eliminating a weight of bound water contained in the heteropoly acid. Also, similarly, the weight of the heteropoly acid compound is defined as a value obtained by eliminating a weight of bound water contained in the heteropoly acid compound.

When the cladding amount of the heteropoly acid and/or the heteropoly acid compound is smaller than the foregoing range, it may be impossible to obtain an effect for suppressing the gas generation in the positive electrode active material. On the other hand, when the cladding amount of the heteropoly acid and/or the heteropoly acid compound is larger than the foregoing range, the discharge capacity of the positive electrode active material is reduced, and therefore, such is not preferable.

In this example of the cladding treatment by a wet method, deposition of the cladding component can be made uniform. It should not be construed that the wet method is limited to this example. For example, a method of impregnating the complex oxide with a solution of the heteropoly acid and/or the heteropoly acid compound dissolved in the solvent to achieve cladding may be adopted. However, according to this method, the elution of a lithium ion of the complex oxide particle into a high-dielectric medium to be used as the solvent, for example, water, etc. is remarkable, and the capacity of the positive electrode active material is lowered. For that reason, in the case of the cladding treatment by a wet method, the foregoing example is preferable.

[Dry Method]

The cladding treatment with a heteropoly acid and/or a heteropoly acid compound by a dry method is described. For cladding with a heteropoly acid and/or a heteropoly acid compound by a dry method, a known technique can be adopted.

Specifically, a dried complex oxide particle and a dried particle of a heteropoly acid and/or a heteropoly acid compound are used, and cladding is performed by a method by means of a manpower using a mortar, a method using a triturator, a method using a high-speed machine due to a high shear force for generating mechanical aggregation, or the like.

[Heat Treatment]

Next, the positive electrode active material according to the First Embodiment can be obtained by baking the complex oxide particle having been subjected to a cladding treatment through a heat treatment. The complex oxide particle after the heat treatment may be subjected to particle size adjustment by means of a light pulverization or classification operation or the like, if desired.

In this heat treatment, a heteropoly acid ion is produced from the heteropoly acid and/or the heteropoly acid compound. This heteropoly acid ion diffuses into the surface of the lithium complex oxide particle composed mainly of nickel and covers the surface. It may be considered that this contributes to dissolution of the Factor 2'.

Furthermore, the heteropoly acid ion produced in the heat treatment undergoes a substitution reaction with a part of the carbonic acid root remaining on the surface of the lithium complex oxide particle composed mainly of nickel. According to this, a part of the carbonic acid root existing on the surface of the particle is released as a carbonic acid gas outside the system, and a content of the carbonic acid root of the positive electrode active material itself is lowered. Thus, a reduction of the gas generation can be expected, too. That is, it can be expected that this contributes to dissolution of the Factor 1'.

[Heat Treatment Temperature]

In the heating step, the heat treatment temperature is preferably 150° C. or higher and not higher than 500° C. When the temperature is higher than this optimal temperature range, the thermal stability of the heteropoly acid ion is lowered so that it becomes difficult to obtain the desired effect. On the other hand, when the temperature is lower than this optimal temperature range, thermal decomposition of the heteropoly acid and/or the heteropoly acid compound or surface diffusion of a product is impaired so that it becomes difficult to obtain the desired effect.

[Atmosphere of Heat Treatment]

As to the atmosphere condition of the heat treatment, an oxidative atmosphere which is usually employed for the preparation of lithium nickelate is preferable.

[Effect]

In the manufacturing method of a positive electrode active material according to the Seventh Embodiment, a treatment of cladding the surface of a lithium complex oxide composed mainly of nickel with a heteropoly acid and/or a heteropoly acid compound is carried out. According to this, a coating layer containing a heteropoly acid and/or a heteropoly acid compound is formed on the surface of the lithium complex oxide composed mainly of nickel. According to this, an oxidation activity of the surface of the lithium complex oxide particle composed mainly of nickel in a charged state can be suppressed. Accordingly, the gas generation to be caused due to decomposition of a nonaqueous electrolytic solution or the like can be suppressed.

Also, in the manufacturing method of a positive electrode active material according to the Seventh Embodiment, a part of the carbonic acid root remaining on the surface of the positive electrode active material is reduced by the cladding treatment with a heteropoly acid and/or a heteropoly acid compound and the heat treatment. According to this, the gas generation from the positive electrode active material itself can be suppressed.

8. Eighth Embodiment (Fourth Example of Nonaqueous Electrolyte Battery)

Similar to the first example of the nonaqueous electrolyte battery according to the Third Embodiment, as shown in FIG. 1, this nonaqueous electrolyte battery has a configuration in which a wound electrode body 10 having a positive electrode lead 11 and a negative electrode lead 12 installed therein is housed in the inside of an exterior member 1 in a film form and has a flat shape.

The positive electrode lead 11 and the negative electrode lead 12 are, for example, in a strip form and are led out from the inside toward the outside of the exterior member 1 in, for example, the same direction, respectively. The positive electrode lead 11 is, for example, constituted of a metal material such as aluminum (Al), and the negative electrode lead 12 is, for example, constituted of a metal material such as nickel (Ni).

The exterior member 1 is, for example, a laminated film having a structure in which an insulating layer, a metal layer and an outermost layer are laminated in this order and stuck to each other by means of lamination processing or the like. In the exterior member 1, for example, respective outer peripheries are brought into intimate contact with each other by means of fusion or with an adhesive while making the side of the insulating layer inward.

The insulating layer is, for example, constituted of a polyolefin resin such as polyethylene, polypropylene, modified polyethylene, modified polypropylene and copolymers thereof. This is because the moisture permeability can be made low, and excellent air tightness can be revealed. The metal layer is constituted of aluminum, stainless steel, nickel, iron or the like in a foil form or a plate form. The outermost layer may be, for example, constituted of the same resin as that in the insulating layer or may be constituted of nylon or the like. This is because the strength against breakage, piercing or the like can be increased. The exterior member 1 may be provided with other layer than the insulating layer, the metal layer and the outermost layer.

A contact film 2 is inserted between the exterior member 1 and each of the positive electrode lead 11 and the negative electrode lead 12 for the purpose of enhancing adhesion between each of the positive electrode lead 11 and the negative electrode lead 12 and the inside of the exterior member 1, thereby preventing invasion of the outside air from occurring. The contact film 2 is constituted of a material having adhesion to each of the positive electrode lead 11 and the negative electrode lead 12. In the case where each of the positive electrode lead 11 and the negative electrode lead 12 is constituted of the foregoing metal material, it is preferable that each of the positive electrode lead 11 and the negative electrode lead 12 is constituted of a polyolefin resin such as polyethylene, polypropylene, modified polyethylene and modified polypropylene.

FIG. 2 is a sectional view along an II-II line of the wound electrode body 10 shown in FIG. 1. In the wound electrode body 10, a positive electrode 13 and a negative electrode 14 are laminated via a separator 15 and an electrolyte 16 and wound, and an outermost peripheral part of the wound electrode body 10 is protected by a protective tape 17.

The positive electrode 13 includes, for example, a positive electrode collector 13A and a positive electrode active material layer 13B provided on the both surfaces of this positive electrode collector 13A. The positive electrode collector 13A is, for example, constituted of a metal foil such as an aluminum foil.

In the Eighth Embodiment, the positive electrode active material layer 13B contains the foregoing positive electrode active material according to the Sixth Embodiment. Also, the positive electrode active material layer 13B further contains a conductive assistant such as a carbon material and a binder such as polyvinylidene fluoride and polytetrafluoroethylene.

Similar to the positive electrode 13, the negative electrode 14 includes, for example, a negative electrode collector 14A and a negative electrode active material layer 14B provided on the both surfaces of this negative electrode collector 14A. The negative electrode collector 14A is, for example, constituted of a metal foil such as a copper foil.

The negative electrode active material layer 14B is, for example, constituted so as to contain, as a negative electrode active material, any one kind or two or more kinds of negative electrode materials capable of intercalating and deintercalating lithium. If desired, the negative electrode active material layer 14B may contain a conductive assistant and a binder.

Examples of the negative electrode material capable of intercalating and deintercalating lithium include carbon materials such as graphite, hardly graphitized carbon and easily graphitized carbon. Such a carbon material may be used singly or in admixture of two or more kinds thereof. Also, a mixture of two or more kinds of carbon materials having a different average particle size from each other may be used.

Also, examples of the negative electrode material capable of intercalating and deintercalating lithium include materials containing, as a constituent element, a metal element or a semi-metal element capable of forming an alloy together with lithium. Specific examples thereof include a simple substance, an alloy or a compound of a metal element capable of forming an alloy together with lithium; a simple substance, an alloy or a compound of a semi-metal element capable of forming an alloy together with lithium; and a material having one or two or more kinds of a phase in at least a part thereof.

Examples of such a metal element or semi-metal element include tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Above all, a metal element or a semi-metal element belonging to the Group 14 of the long form of the periodic table is preferable; and silicon (Si) and tin (Sn) are especially preferable. This is because silicon (Si) and tin (Sn) have large capability to intercalate and deintercalate lithium and are able to obtain a high energy density.

Examples of alloys of silicon (Si) include alloys containing, as a second constituent element other than silicon (Si), at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Examples of alloys of tin (Sn) include alloys containing, as a second constituent element other than tin (Sn), at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of silicon (Si) or compounds of tin (Sn) include compounds containing oxygen (O) or carbon (C), and these compounds may contain the foregoing second constituent element in addition to silicon (Si) or tin (Sn).

As the separator 15, any material is useful so far as it is chemically stable against the positive electrode active material, the negative electrode active material or the solvent and does not have electrical conductivity. Examples thereof include a nonwoven fabric of a polymer, a porous film and a material obtained by forming glass or ceramic fibers into a paper shape, and a plurality of these materials may be laminated and used. In particular, it is preferable to use a porous polyolefin film, and this may be compounded with a heat-resistant material made of polyimide, glass or ceramic fibers and used.

The electrolyte 16 contains an electrolytic solution and a holding material containing a polymer compound capable of holding this electrolytic solution therein and is formed in a so-called gel state. The electrolytic solution contains an electrolyte salt and a solvent for dissolving this electrolyte salt therein. Examples of the electrolyte salt include lithium salts such as $LiPF_6$, $LiClO_4$, $LiBF_4$, $LiN(SO_2CF_3)_2$, $LiN(SO_2C_2F_5)_2$ and $LiAsF_6$. The electrolyte salt may be used singly or in admixture of two or more kinds thereof.

Examples of the solvent include nonaqueous solvents, for example, lactone based solvents such as γ-butyrolactone, γ-valerolactone, δ-valerolactone and ε-caprolactone; carbonate based solvents such as ethylene carbonate, propylene carbonate, butylene carbonate, vinylene carbonate, dimethyl carbonate, ethyl methyl carbonate and diethyl carbonate; ether based solvents such as 1,2-dimethoxyethane, 1-ethoxy-2-methoxyethane, 1,2-diethoxyethane, tetrahydrofuran and 2-methyltetrahydrofuran; nitrile based solvents such as acetonitrile; sulfolane based solvents; phosphoric acids; phosphate solvents; pyrrolidones; and the like. The solvent may be used singly or in admixture of two or more kinds thereof.

Also, it is preferable that the solvent contains a compound obtained by fluorinating a part or the whole of hydrogens of a cyclic ester or a chain ester. As such a fluorinated compound, it is preferable to use difluoroethylene carbonate (4,5-difluoro-1,3-dioxolan-2-one). This is because even in the case where the negative electrode 14 containing, as a negative electrode active material, a compound of silicone (Si), tin (Sn), germanium (Ge) or the like is used, a charge and discharge cycle characteristic can be enhanced, and in particular, difluoroethylene carbonate is excellent in an effect for improving the cycle characteristic.

Any material is useful as the polymer compound so far as it is gelated upon absorbing the solvent therein. Examples thereof include fluorine based polymer compounds such as polyvinylidene fluoride and a copolymer of vinylidene fluoride and hexafluoropropylene; ether based polymer compounds such as polyethylene oxide and a crosslinked material containing polyethylene oxide; and compounds containing, as a repeating unit, polyacrylonitrile, polypropylene oxide or polymethyl methacrylate. The polymer compound may be used singly or in admixture of two or more kinds thereof.

In particular, from the standpoint of oxidation-reduction stability, fluorine based polymer compounds are desirable; and above all, a copolymer containing, as components, vinylidene fluoride and hexafluoropropylene is preferable. Furthermore, this copolymer may contain, as a component, a monoester of an unsaturated dibasic acid such as monomethyl maleate, a halogenated ethylene such as trifluorochloroethylene, a cyclic carbonate of an unsaturated compound such as vinylene carbonate, an epoxy group-containing acryl vinyl monomer or the like. This is because higher characteristics are obtainable.

[Manufacturing Method of Nonaqueous Electrolyte Battery]

This nonaqueous electrolyte battery can be, for example, manufactured in the following manner. First of all, the positive electrode 13 is prepared in the following manner. First of all, the foregoing positive electrode active material and a binder are mixed to prepare a positive electrode mixture, and this positive electrode mixture is dispersed in a solvent such as N-methyl-2-pyrrolidone to form a positive electrode mixture slurry. Subsequently, this positive electrode mixture slurry is coated on the positive electrode collector 13A, and after drying the solvent, the resultant is subjected to compression molding by a roll press or the like, thereby forming the positive electrode active material layer 13B. There is thus obtained the positive electrode 13.

Subsequently, the negative electrode 14 is prepared in the following manner. First of all, a negative electrode active material and a binder are mixed to prepare a negative electrode mixture, and this negative electrode mixture is dispersed in a solvent such as N-methyl-2-pyrrolidone to form a negative electrode mixture slurry. Subsequently, this negative electrode mixture slurry is coated on the negative electrode collector 14A, and after drying the solvent, the resultant is subjected to compression molding by a roll press or the like, thereby forming the negative electrode active material layer 14B. There is thus obtained the negative electrode 14.

A precursor solution containing an electrolytic solution, a polymer compound and a mixed solvent is coated on each of the thus obtained positive electrode 13 and negative electrode 14, and the mixed solvent is volatilized off to form the electrolyte 16. Thereafter, the positive electrode lead 11 is installed in an end of the positive electrode collector 13A by means of welding, and the negative electrode lead 12 is also installed in an end of the negative electrode collector 14A by means of welding.

Subsequently, the positive electrode 13 and the negative electrode 14 on each of which is formed the electrolyte 16 are laminated via the separator 15 to form a laminate; this laminate is then wound in the longitudinal direction; and the protective tape 17 is allowed to adhere to the outermost peripheral part to form the wound electrode body 10. Finally, for example, the wound electrode body 10 is interposed into the exterior member 1, and the outer edges of the exterior member 1 are brought into intimate contact with each other by means of heat fusion or the like, thereby enclosing the wound electrode body 10 therein. On that occasion, the contact film 2 is inserted between each of the positive electrode lead 11 and the negative electrode lead 12 and the exterior member 1. According to this, the nonaqueous electrolyte battery shown in FIGS. 1 and 2 is completed.

Also, this nonaqueous electrolyte battery may be prepared in the following manner. First of all, as described previously, the positive electrode 13 and the negative electrode 14 are prepared, and the positive electrode lead 11 and the negative electrode lead 12 are installed in the positive electrode 13 and the negative electrode 14, respectively. Subsequently, the positive electrode 13 and the negative electrode 14 are laminated via the separator 15, and the protective tape 17 is allowed to adhere to the outermost peripheral part, thereby forming a wound body as a precursor of thee wound electrode body 10. Subsequently, this wound body is interposed into the exterior member 1, and the outer edges exclusive of one side are subjected to heat fusion to form a bag, which is then housed in the inside of the exterior member 1. Subsequently, an electrolyte composition containing an electrolytic solution, a monomer as a raw material of a polymer compound, a polymerization initiator and optionally, other materials such as a polymerization inhibitor is prepared and injected into the inside of the exterior member 1.

After the electrolyte composition is injected, an opening of the exterior member 1 is hermetically sealed by means of heat fusion in a vacuum atmosphere. Subsequently, the monomer is polymerized upon heating to form a polymer compound, thereby forming the gel electrolyte 16; and a nonaqueous electrolyte battery shown in FIGS. 3 and 4 is assembled.

[Effect]

According to the Eight Embodiment of the present invention, the positive electrode active material according to the foregoing First Embodiment is used for the positive electrode active material. According to this configuration, the gas generation of the electrolytic solution can be suppressed, and the blister of a battery can be suppressed.

9. Ninth Embodiment (Fifth Example of Nonaqueous Electrolyte Battery)

Next, the Ninth Embodiment is described. The nonaqueous electrolyte battery according to the Ninth Embodiment is one obtained by using an electrolytic solution in place of the gel electrolyte 16 in the nonaqueous electrolyte battery according to the Eighth Embodiment. In that case, the electrolytic solution is impregnated in the separator 15. As the electrolytic solution, an electrolytic solution the same as that in the foregoing Eighth Embodiment is useful.

The nonaqueous electrolyte battery having such a configuration can be, for example, prepared in the following manner. First of all, the positive electrode 13 and the negative electrode 14 are prepared. Subsequently, the positive electrode lead 11 and the negative electrode lead 12 are installed in the positive electrode 13 and the negative electrode 14, respectively; the positive electrode 13 and the negative electrode 14 are then laminated via the separator 15 and wound; and the protective tape 17 is allowed to adhere to the outermost peripheral part. According to this, a wound electrode body having a configuration in which the electrolyte 16 is omitted in the configuration of the wound electrode body 10. This wound electrode body is interposed into the exterior member 1, the electrolytic solution is then injected, and the exterior member 1 is hermetically sealed.

[Effect]

According to the Ninth Embodiment, the same effect as that in the foregoing Eighth Embodiment is obtainable. That is, by using the positive electrode active material according to the foregoing First Embodiment as the positive electrode active material, the gas generation of the electrolytic solution can be suppressed, and the blister of a battery can be suppressed.

10. Tenth Embodiment (Sixth Example of Nonaqueous Electrolyte Battery)

Next, a configuration of the nonaqueous electrolyte battery according to the Tenth Embodiment is described. Similar to the nonaqueous electrolyte battery according to the Fifth Embodiment, the nonaqueous electrolyte battery according to this Tenth Embodiment is of a so-called cylinder type as shown in FIG. 3 and has a wound electrode body 30 in which a strip-shaped positive electrode 31 and a strip-shaped negative electrode 32 are wound via a separator 33 in the inside of a substantially hollow columnar battery can 21. The separator 33 is impregnated with an electrolytic solution which is a liquid electrolyte. The battery can 21 is made of, for example, nickel (Ni)-plated iron (Fe), and one end thereof is closed, with the other end being opened. A pair of insulating plates 22 and 23 is disposed in the inside of the battery can 21 vertically against the wound peripheral surface so as to interpose the wound electrode body 30 therebetween.

In the open end of the battery can 21, a battery lid 24 is installed by caulking with a safety valve mechanism 25 and a positive temperature coefficient element (PTC element) 26 provided in the inside of this battery lid 24 via a gasket 27, and the inside of the battery can 21 is hermetically sealed. The battery lid 24 is made of, for example, a material the same as that in the battery can 21. The safety valve mechanism 25 is electrically connected to the battery lid 24 via the positive temperature coefficient element 26. In the safety valve mechanism 25, in the case where the internal pressure of the battery reaches a fixed value or more due to an internal short circuit, heating from the outside or the like, a disc plate 25A is reversed, whereby electrical connection between the battery lid 24 and the wound electrode body 30 is disconnected. When the temperature rises, the positive temperature coefficient element 26 controls a current due to an increase of a resistance value, whereby abnormal heat generation to be caused due to a large current is prevented from occurring. The gasket 27 is made of, for example, an insulating material, and asphalt is coated on the surface thereof.

For example, the wound electrode body 30 is wound centering on a center pin 34. A positive electrode lead 35 made of aluminum (Al), etc. is connected to the positive electrode 31 of the wound electrode body 30; and a negative electrode lead 36 made of nickel (Ni), etc. is connected to the negative electrode 32. The positive electrode lead 35 is welded to the safety valve mechanism 25, whereby it is electrically connected to the battery lid 24; and the negative electrode lead 36 is welded to the battery can 21, whereby it is electrically connected thereto.

FIG. 4 enlargedly shows a part of the wound electrode body 30 shown in FIG. 3. The wound electrode body 30 is one in which the positive electrode 31 and the negative electrode 32 are laminated via the separator 33 and wound.

The positive electrode 31 includes, for example, a positive electrode collector 31A and a positive electrode active material layer 31B provided on the both surfaces of this positive electrode collector 31A. The negative electrode 32 includes, for example, a negative electrode collector 32A and a negative electrode active material layer 32B provided on the both surfaces of this negative electrode collector 32A. The configurations of the positive electrode collector 31A, the positive electrode active material layer 31B, the negative electrode collector 32A, the negative electrode active material layer 32B, the separator 33 and the electrolytic solution are the same as those of the positive electrode collector 13A, the positive electrode active material layer 13B, the negative electrode collector 14A, the negative electrode active material layer 14B, the separator 15 and the electrolytic solution in the foregoing Third Embodiment, respectively.

Then, in the nonaqueous electrolyte battery according to the Tenth Embodiment, the positive electrode active material is the positive electrode active material according to the foregoing Sixth Embodiment.

Next, the manufacturing method of the nonaqueous electrolyte battery according to the Tenth Embodiment is described.

The positive electrode 31 is prepared in the following manner. As described previously, the positive electrode active material layer 31B is formed on the positive electrode collector 31A, thereby obtaining the positive electrode 31. First of all, the foregoing positive electrode active material and a binder are mixed to prepare a positive electrode mixture, and this positive electrode mixture is dispersed in a solvent such as N-methyl-2-pyrrolidone to form a positive electrode mixture slurry. Subsequently, this positive electrode mixture slurry is coated on the positive electrode collector 31A, and after drying the solvent, the resultant is subjected to compression molding by a roll press or the like, thereby forming the positive electrode active material layer 31B. There is thus obtained the positive electrode 31.

The negative electrode 32 is prepared in the following manner. First of all, a negative electrode active material and a binder are mixed to prepare a negative electrode mixture, and this negative electrode mixture is dispersed in a solvent such as N-methyl-2-pyrrolidone to form a negative electrode mixture slurry. Subsequently, this negative electrode mixture slurry is coated on the negative electrode collector 32A, and after drying the solvent, the resultant is subjected to compression molding by a roll press or the like, thereby forming the negative electrode active material layer 32B. There is thus obtained the negative electrode 32.

Subsequently, the positive electrode lead 35 is installed in the positive electrode collector 31A by means of welding or the like, and the negative electrode lead 36 is also installed in the negative electrode collector 32A by means of welding or the like. Thereafter, the positive electrode 31 and the negative electrode 32 are wound via the separator 33; a tip of the positive electrode lead 35 is welded to the safety valve mechanism 25. A tip of the negative electrode lead 36 is also welded to the battery can 21, thereby housing the wound positive electrode 31 and negative electrode 32 in the inside of the battery can 21 while being interposed between the pair of the insulating plates 22 and 23. After housing the positive electrode 31 and the negative electrode 32 in the inside of the battery can 21, the electrolyte is injected into the inside of the battery can 21 and impregnated in the separator 33. Thereafter, the battery lid 24, the safety valve mechanism 25 and the positive temperature coefficient element 26 are fixed to the open end of the battery can 21 via the gasket 27 by caulking There is thus prepared the nonaqueous secondary battery shown in FIG. 3.

[Effect]

In the nonaqueous electrolyte battery according to the Tenth Embodiment, by using the positive electrode active material according to the Sixth Embodiment, the gas generation can be suppressed, and a breakage to be caused due to an increase of the internal pressure can be prevented from occurring.

EXAMPLES

The present embodiments are specifically described below with reference to the following Examples, but it should not be construed that the embodiments are limited to only these Examples.

Example 1

A positive electrode active material and a nonaqueous electrolyte secondary battery were prepared in the following manners.

[Preparation of Positive Electrode Active Material]

First of all, nickel sulfate, cobalt sulfate and sodium aluminate were dissolved in water, and a sodium hydroxide solution was further added to the mixture while thoroughly stirring. At that time, a molar ratio of nickel (Ni) to cobalt (Co) to aluminum (Al) was regulated at Ni/Co/Al=77/20/3, thereby obtaining a nickel-cobalt-aluminum complex coprecipitated hydroxide. The formed coprecipitate was washed with water and dried, and lithium hydroxide monohydrate was then added so as to adjust a molar ratio of Li/(Ni+Co+Al) at 98/100, thereby preparing a precursor.

The precursor was baked in an oxygen gas stream at 700° C. for 10 hours, and the baked material was cooled to room temperature and then pulverized to obtain a complex oxide particle composed mainly of lithium nickelate, which is represented by a composition formula of $Li_{0.98}Ni_{0.77}Co_{0.20}Al_{0.03}O_2$. The complex oxide particle was measured by the laser scattering method. As a result, it was found to have an average particle size of 14 μm.

To 100 parts by weight of the foregoing complex oxide particle, 3.0 parts by weight of ammonium metatungstate $[(NH_4)_6W_{12}O_{39}]$ was added, and the mixture was thoroughly mixed in a mortar. This mixture was baked in an oxygen gas stream at 300° C. for 4 hours, and the baked material was cooled to room temperature and then taken out, followed by pulverization. There was thus obtained a positive electrode active material.

(Preparation of Nonaqueous Electrolyte Secondary Battery)

A nonaqueous electrolyte secondary battery described below was prepared using the thus prepared positive electrode active material.

First of all, 90 parts by mass of the obtained positive electrode active material, 5 parts by mass of graphite as a conductive agent and 5 parts by mass of polyvinylidene fluoride as a binder were mixed to prepare a positive electrode mixture. Subsequently, this positive electrode mixture was dispersed in N-methyl-2-pyrrolidone as a dispersion medium to form a positive electrode mixture slurry. This positive electrode mixture slurry was uniformly coated on the both surfaces of a 20 μm-thick positive electrode collector made of an aluminum foil and dried, and the resultant was subjected to compression molding by a roll press, thereby forming a positive electrode active material layer. There was thus prepared a positive electrode. Subsequently, a positive electrode terminal was installed in a positive electrode collector-exposed portion of the positive electrode.

Subsequently, 95 parts by mass of a pulverized graphite powder as a negative electrode active material and 5 parts by mass of polyvinylidene fluoride as a binder were mixed to prepare a negative electrode mixture, which was then dispersed in N-methyl-2-pyrrolidone as a dispersion medium to form a negative electrode mixture slurry. Subsequently, this negative electrode mixture slurry was uniformly coated on the both surfaces of a 15 μm-thick negative electrode collector made of a copper foil and dried, and the resultant was subjected to compression molding by a roll press, thereby forming a negative electrode active material layer. There was thus prepared a negative electrode. Subsequently, a negative electrode terminal was installed in a negative electrode collector-exposed portion of the negative electrode.

Subsequently, the thus prepared positive electrode and negative electrode were brought into intimate contact with each other via a 25 μm-thick separator made of a microporous polyethylene film and wound in a longitudinal direction, and a protective tape was stuck to an outermost peripheral part, thereby preparing a wound body. Subsequently, this wound body was filled in an exterior material, and three sides of the exterior material were heat fused, while the remaining one side was opened without being heat fused. For the exterior material, a moisture proof aluminum laminated film obtained by laminating a 25 μm-thick nylon film, a 40 μm-thick aluminum foil and a 30 μm-thick polypropylene film in this order from the outermost layer was used.

Subsequently, 1 mole/L of lithium hexafluorophosphate ($LiPF_6$) as an electrolyte salt was dissolved in a mixed solvent of ethylene carbonate (EC) and ethyl methyl carbonate (EMC) in a molar ratio of 5/5, thereby preparing an electrolytic solution. This electrolytic solution was injected from the opening of the exterior material, and the remaining one side of the exterior material was heat fused under a reduced pressure to hermetically seal the exterior material. There was thus prepared a nonaqueous electrolyte secondary battery.

Example 2

A positive electrode active material was obtained in the same manner as in Example 1, except that in the manufacturing step of a positive electrode active material of Example 1, 3.0 parts by weight of ammonium paratungstate $[(NH_4)_{10}W_{12}O_{41}]$ was used in place of 3.0 parts by weight of ammonium metatungstate $[(NH_4)_6W_{12}O_{39}]$. By using this positive electrode active material, a nonaqueous electrolyte secondary battery was prepared in the same manner as in Example 1.

Example 3

A positive electrode active material was obtained in the same manner as in Example 1, except that in the manufacturing step of a positive electrode active material of Example 1, 1.1 parts by weight of silicotungstic acid [$H_4(SiW_{12}O_{40})$] was used in place of 3.0 parts by weight of ammonium metatungstate [$(NH_4)_6W_{12}O_{39}$]. By using this positive electrode active material, a nonaqueous electrolyte secondary battery was prepared in the same manner as in Example 1.

Example 4

A positive electrode active material was obtained in the same manner as in Example 1, except that in the manufacturing step of a positive electrode active material of Example 1, 3.5 parts by weight of phosphotungstic acid [$H_3(PW_{12}O_{40})$] was used in place of 3.0 parts by weight of ammonium metatungstate [$(NH_4)_6W_{12}O_{39}$]. By using this positive electrode active material, a nonaqueous electrolyte secondary battery was prepared in the same manner as in Example 1.

Example 5

A positive electrode active material was obtained in the same manner as in Example 4, except that in the manufacturing step of a positive electrode active material of Example 4, the heat treatment was carried out in an oxygen gas stream under a condition at 200° C. for 0.5 hours. By using this positive electrode active material, a nonaqueous electrolyte secondary battery was prepared in the same manner as in Example 1.

Example 6

A positive electrode active material was obtained in the same manner as in Example 1, except that in the manufacturing step of a positive electrode active material of Example 1, 0.3 parts by weight of phosphomolybdic acid [$H_3(PMo_{12}O_{40})$] was used in place of 3.0 parts by weight of ammonium metatungstate [$(NH_4)_6W_{12}O_{39}$]. By using this positive electrode active material, a nonaqueous electrolyte secondary battery was prepared in the same manner as in Example 1.

Comparative Example 1

A positive electrode active material was obtained in the same manner as in Example 1, except that in the manufacturing step of a positive electrode active material of Example 1, the addition, mixing and heat treatment of ammonium metatungstate [$(NH_4)_6W_{12}O_{39}$] were not carried out. By using this positive electrode active material, a nonaqueous electrolyte secondary battery was prepared in the same manner as in Example 1.

Comparative Example 2

A positive electrode active material was obtained in the same manner as in Example 6, except that in the manufacturing step of a positive electrode active material of Example 6, the addition amount of phosphomolybdic acid [$H_3(PMo_{12}O_{40})$] was changed from 0.3 parts by weight to 0.03 parts by weight. By using this positive electrode active material, a nonaqueous electrolyte secondary battery was prepared in the same manner as in Example 1.

(Evaluation)

By using each of the thus prepared positive electrode active materials and nonaqueous electrolyte secondary batteries, the following measurements and tests were carried out, thereby evaluating the characteristics.

[pH Measurement]

1.0 part by weight of each of the prepared positive electrode active materials was dispersed in 50 parts by weight of water, and a pH of a supernatant of water having the positive electrode active material sedimented therein was measured.

[Measurement of Content of Carbonic Acid Component]

With respect to each of the prepared positive electrode active materials, a content of a carbonic acid component contained in the positive electrode active material was measured by the AGK method described in JIS-R-9101.

[Charge and Discharge Test]

Each of the prepared nonaqueous electrolyte secondary batteries was subjected to constant-current charge in an environment at 23° C. at a constant current of 880 mA until a battery voltage reached 4.25 V relative to metallic lithium and then subjected to constant-voltage charge at a constant voltage of 4.25 V until a current value reached 1 mA. Subsequently, the resulting nonaqueous electrolyte secondary battery was subjected to constant-current discharge at a constant current of 80 mA until a battery voltage reached 2.50 V relative to metallic lithium. According to the foregoing charge and discharge test, charge and discharge efficiency and discharge capacity of the positive electrode active material were obtained.

[High-Temperature Storage Test]

Each of the prepared nonaqueous electrolyte secondary batteries was subjected to constant-current charge in an environment at 23° C. at a constant current of 880 mA until a battery voltage reached 4.2 V and then subjected to constant-voltage charge at a constant voltage of 4.2 V until a current value reached 1 mA. Thereafter, the nonaqueous electrolyte secondary battery in a fully charged state was stored in an environment at 80° C. for 4 days. At that time, an amount of change in a thickness of the nonaqueous electrolyte secondary battery was measured as a blister amount at the time of high-temperature storage.

The measurement results are summarized and shown in Table 1.

TABLE 1

| | Complex oxide particle | | | | Content of carbonic acid component [% by weight] | Blister amount of battery [mm] |
|---|---|---|---|---|---|---|
| | Composition formula | Average particle size [μm] | Coating material | Heat treatment | | |
| Example 7 | $Li_{1.03}Ni_{0.77}Co_{0.20}Al_{0.03}O_2$ | 13 | Ammonium phosphomolybdate | At 300° C. for 4 hours | 0.07 | 2.01 |
| Example 8 | $Li_{1.03}Ni_{0.77}Co_{0.20}Al_{0.03}O_2$ | 13 | Ammonium phosphotungstate | At 300° C. for 4 hours | 0.11 | 2.84 |
| Example 9 | $Li_{1.03}Ni_{0.77}Co_{0.20}Al_{0.03}O_2$ | 13 | Phosphomolybdic acid | At 300° C. for 4 hours | 0.14 | 3.24 |
| Example 10 | $Li_{1.03}Ni_{0.77}Co_{0.20}Al_{0.03}O_2$ | 13 | Phosphotungstic acid | At 300° C. for 4 hours | 0.15 | 3.87 |

TABLE 1-continued

| | Complex oxide particle | | | | Content of carbonic acid component [% by weight] | Blister amount of battery [mm] |
|---|---|---|---|---|---|---|
| | Composition formula | Average particle size [μm] | Coating material | Heat treatment | | |
| Example 11 | $Li_{1.03}Ni_{0.77}Co_{0.20}Al_{0.03}O_2$ | 13 | Silicomolybdic acid | At 300° C. for 4 hours | 0.12 | 4.32 |
| Example 12 | $Li_{1.03}Ni_{0.77}Co_{0.20}Al_{0.03}O_2$ | 13 | Silicotungstic acid | At 300° C. for 4 hours | 0.14 | 4.83 |
| Example 13 | $Li_{1.03}Ni_{0.77}Co_{0.20}Al_{0.03}O_2$ | 13 | Ammonium phosphomolybdate | At 300° C. for 4 hours | 0.09 | 2.35 |
| Comparative Example 3 | $Li_{1.03}Ni_{0.77}Co_{0.20}Al_{0.03}O_2$ | 13 | No | No | 0.24 | 8.20 |
| Comparative Example 4 | $Li_{1.03}Ni_{0.77}Co_{0.20}Al_{0.03}O_2$ | 13 | No | At 700° C. for 4 hours | 0.23 | 9.50 |

[Evaluation]

Comparison between Examples 1 to 6 and Comparative Examples 1 to 2 revealed the following.

It was noted that in Examples 1 to 6, the pH of the positive electrode active material was lower than 8.0; that the content of the carbonic acid component in the positive electrode active material was small; and that the blister amount of the battery was suppressed. Also, Examples 1 to 6 revealed a favorable characteristic in the charge and discharge efficiency.

In the following Examples and Comparative Examples, the weight of the heteropoly acid is defined as a value obtained by eliminating a weight of bound water contained in the heteropoly acid. Also, similarly, the weight of the heteropoly acid compound is defined as a value obtained by eliminating a weight of bound water contained in the heteropoly acid compound.

Example 7

A positive electrode active material and a nonaqueous electrolyte secondary battery were prepared in the following manners.

[Preparation of Positive Electrode Active Material]

First of all, nickel sulfate, cobalt sulfate and sodium aluminate were dissolved in water, and a sodium hydroxide solution was further added to the mixture while thoroughly stirring. At that time, a molar ratio of nickel (Ni) to cobalt (Co) to aluminum (Al) was regulated at Ni/Co/Al=77/20/3, thereby obtaining a nickel-cobalt-aluminum complex coprecipitated hydroxide. The formed coprecipitate was washed with water and dried, and lithium hydroxide monohydrate was then added so as to adjust a molar ratio of Li/(Ni+Co+Al) at 105/100, thereby preparing a precursor.

The precursor was baked in an oxygen gas stream at 700° C. for 10 hours, and the baked material was cooled to room temperature and then pulverized to obtain a lithium complex oxide particle composed mainly of nickel, which is represented by a composition formula of $Li_{1.03}Ni_{0.77}Co_{0.20}Al_{0.03}O_2$. The complex oxide particle was measured by the laser scattering method. As a result, it was found to have an average particle size of 13 μm.

To 100 parts by weight of the foregoing complex oxide particle, 1.0 part by weight of ammonium phosphomolybdate $[(NH_4)_3PO_4.12MoO_3]$ was added, and the mixture was thoroughly mixed in a mortar. This mixture was baked in an oxygen gas stream at 300° C. for 4 hours, and the baked material was cooled to room temperature and then taken out, followed by pulverization. There was thus obtained a positive electrode active material.

[Preparation of Nonaqueous Electrolyte Secondary Battery]

A nonaqueous electrolyte secondary battery described below was prepared using the thus prepared positive electrode active material.

First of all, 85 parts by mass of the obtained positive electrode active material, 5 parts by mass of graphite as a conductive agent and 10 parts by mass of polyvinylidene fluoride as a binder were mixed to prepare a positive electrode mixture. Subsequently, this positive electrode mixture was dispersed in N-methyl-2-pyrrolidone as a dispersion medium to form a positive electrode mixture slurry. This positive electrode mixture slurry was uniformly coated on the both surfaces of a 20 μm-thick positive electrode collector made of an aluminum foil and dried, and the resultant was subjected to compression molding by a roll press, thereby forming a positive electrode active material layer. There was thus prepared a positive electrode. Subsequently, a positive electrode terminal was installed in a positive electrode collector-exposed portion of the positive electrode.

Subsequently, 90 parts by mass of a pulverized graphite powder as a negative electrode active material and 10 parts by mass of polyvinylidene fluoride as a binder were mixed to prepare a negative electrode mixture, which was then dispersed in N-methyl-2-pyrrolidone as a dispersion medium to form a negative electrode mixture slurry. Subsequently, this negative electrode mixture slurry was uniformly coated on the both surfaces of a 15 μm-thick negative electrode collector made of a copper foil and dried, and the resultant was subjected to compression molding by a roll press, thereby forming a negative electrode active material layer. There was thus prepared a negative electrode. Subsequently, a negative electrode terminal was installed in a negative electrode collector-exposed portion of the negative electrode.

Subsequently, the thus prepared positive electrode and negative electrode were brought into intimate contact with each other via a 25 μm-thick separator made of a microporous polyethylene film and wound in a longitudinal direction, and a protective tape was stuck to an outermost peripheral part, thereby preparing a wound body. Subsequently, this wound body was filled in an exterior material, and three sides of the exterior material were heat fused, while the remaining one side was opened without being heat fused. For the exterior material, a moisture proof aluminum laminated film obtained by laminating a 25 μm-thick nylon film, a 40 μm-thick aluminum foil and a 30 μm-thick polypropylene film in this order from the outermost layer was used.

Subsequently, 1 mol/L of lithium hexafluorophosphate $(LiPF_6)$ as an electrolyte salt was dissolved in a mixed solvent of ethylene carbonate (EC) and ethyl methyl carbonate (EMC) in a molar ratio of 5/5, thereby preparing an electrolytic solution. This electrolytic solution was injected from the opening of the exterior material, and the remaining one side of the exterior material was heat fused under a reduced pressure to hermetically seal the exterior material. There was thus prepared a nonaqueous electrolyte secondary battery.

Example 8

A positive electrode active material was obtained in the same manner as in Example 7, except that 1.0 part by weight, based on 100 parts by weight of the complex oxide particle, of ammonium phosphotungstate [$(NH_4)_3PO_4 \cdot 12WO_3$] was used in place of 1.0 part by weight of ammonium phosphomolybdate [$(NH_4)_3PO_4 \cdot 12MoO_3$]. Also, by using this positive electrode active material, a nonaqueous electrolyte secondary battery was prepared in the same manner as in Example 7.

Example 9

A positive electrode active material was obtained in the same manner as in Example 7, except that 1.0 part by weight, based on 100 parts by weight of the complex oxide particle, of phosphomolybdic acid [$H_3(PMo_{12}O_{40})$] was used in place of 1.0 part by weight of ammonium phosphomolybdate [$(NH_4)_3PO_4 \cdot 12MoO_3$]. Also, by using this positive electrode active material, a nonaqueous electrolyte secondary battery was prepared in the same manner as in Example 7.

Example 10

A positive electrode active material was obtained in the same manner as in Example 7, except that 1.0 part by weight, based on 100 parts by weight of the complex oxide particle, of phosphotungstic acid [$H_3PW_{12}O_{40}$] was used in place of 1.0 part by weight of ammonium phosphomolybdate [$(NH_4)_3PO_4 \cdot 12MoO_3$]. Also, by using this positive electrode active material, a nonaqueous electrolyte secondary battery was prepared in the same manner as in Example 7.

Example 11

A positive electrode active material was obtained in the same manner as in Example 7, except that 1.0 part by weight, based on 100 parts by weight of the complex oxide particle, of silicomolybdic acid [$H4(SiMo_{12}O_{40})$] was used in place of 1.0 part by weight of ammonium phosphomolybdate [$(NH_4)_3PO_4 \cdot 12MoO_3$]. Also, by using this positive electrode active material, a nonaqueous electrolyte secondary battery was prepared in the same manner as in Example 7.

Example 12

A positive electrode active material was obtained in the same manner as in Example 7, except that 1.0 part by weight, based on 100 parts by weight of the complex oxide particle, of silicotungstic acid [$H4(SiW_{12}O_{40})$] was used in place of 1.0 part by weight of ammonium phosphomolybdate [$(NH_4)_3PO_4 \cdot 12MoO_3$]. Also, by using this positive electrode active material, a nonaqueous electrolyte secondary battery was prepared in the same manner as in Example 7.

Example 13

A positive electrode active material was obtained in the same manner as in Example 7, except that 0.5 parts by weight, based on 100 parts by weight of the complex oxide particle, of ammonium phosphomolybdate [$(NH_4)_3PO_4 \cdot 12MoO_3$] was used in place of 1.0 part by weight of ammonium phosphomolybdate [$(NH_4)_3PO_4 \cdot 12MoO_3$]. Also, by using this positive electrode active material, a nonaqueous electrolyte secondary battery was prepared in the same manner as in Example 7.

Comparative Example 3

In Example 7, the lithium complex oxide particle composed mainly of nickel, which is represented by a composition formula of $Li_{1.03}Ni_{0.77}Co_{0.20}Al_{0.03}O_2$, prior to cladding with ammonium phosphomolybdate [$(NH_4)_3PO_4 \cdot 12MoO_3$] was defined as a positive electrode active material of Comparative Example 3. Also, by using this positive electrode active material, a nonaqueous electrolyte secondary battery was prepared in the same manner as in Example 7.

Comparative Example 4

In Example 7, the lithium complex oxide particle composed mainly of nickel, which is represented by a composition formula of $Li_{1.03}Ni_{0.77}Co_{0.20}Al_{0.03}O_2$, prior to cladding with ammonium phosphomolybdate [$(NH_4)_3PO_4 \cdot 12MoO_3$] was subjected to the following treatment, thereby obtaining a positive electrode active material of Comparative Example 4. That is, the foregoing complex oxide particle was baked in an oxygen gas stream at 700° C. for 4 hours, and the baked material was cooled to room temperature and then pulverized to obtain the positive electrode active material of Comparative Example 4. Also, by using this positive electrode active material, a nonaqueous electrolyte secondary battery was prepared in the same manner as in Example 7.

(Evaluation)

By using each of the thus prepared positive electrode active materials and nonaqueous electrolyte secondary batteries, the following measurements and tests were carried out, thereby evaluating the characteristics.

[Measurement of Content of Carbonic Acid Component]

With respect to each of the prepared positive electrode active materials, a content of a carbonic acid component contained in the positive electrode active material was measured by the AGK method described in JIS-R-9101.

[High-Temperature Storage Test]

Each of the prepared nonaqueous electrolyte secondary batteries was subjected to constant-current charge in an environment at 23° C. at a constant current of 880 mA until a battery voltage reached 4.2 V and then subjected to constant-voltage charge at a constant voltage of 4.2 V until a current value reached 1 mA. Thereafter, the nonaqueous electrolyte secondary battery in a fully charged state was stored in an environment at 80° C. for 4 days. At that time, an amount of change in a thickness of the nonaqueous electrolyte secondary battery was measured as a blister amount at the time of high-temperature storage.

The measurement results are summarized and shown in Table 2.

TABLE 2

| | Complex oxide particle | | | Mixing amount | |
| --- | --- | --- | --- | --- | --- |
| | Composition formula | Average particle size [μm] | Coating material | (based on 100 parts by weight of positive electrode active material) | Heat treatment |
| Example 1 | $Li_{1.03}Ni_{0.77}Co_{0.20}Al_{0.03}O_2$ | 14 | Ammonium metatungstate | 3.0 parts by weight | At 300° C. for 4 hours |
| Example 2 | $Li_{1.03}Ni_{0.77}Co_{0.20}Al_{0.03}O_2$ | 14 | Ammonium paratungstate | 3.0 parts by weight | At 300° C. for 4 hours |

TABLE 2-continued

| | | | | | |
|---|---|---|---|---|---|
| Example 3 | $Li_{1.03}Ni_{0.77}Co_{0.20}Al_{0.03}O_2$ | 14 | Silicotungstic acid | 1.1 parts by weight | At 300° C. for 4 hours |
| Example 4 | $Li_{1.03}Ni_{0.77}Co_{0.20}Al_{0.03}O_2$ | 14 | Phosphotungstic acid | 3.5 parts by weight | At 300° C. for 4 hours |
| Example 5 | $Li_{1.03}Ni_{0.77}Co_{0.20}Al_{0.03}O_2$ | 14 | Phosphotungstic acid | 3.5 parts by weight | At 200° C. for 0.5 hours |
| Example 6 | $Li_{1.03}Ni_{0.77}Co_{0.20}Al_{0.03}O_2$ | 14 | Phosphomolybdic acid | 0.3 parts by weight | At 300° C. for 4 hours |
| Comparative Example 1 | $Li_{1.03}Ni_{0.77}Co_{0.20}Al_{0.03}O_2$ | 14 | No | No | No |
| Comparative Example 2 | $Li_{1.03}Ni_{0.77}Co_{0.20}Al_{0.03}O_2$ | 14 | Phosphomolybdic acid | 0.03 parts by weight | At 300° C. for 4 hours |

| | pH | Content of carbonic acid component [% by weight] | Blister amount of battery [mm] | Discharge capacity [mAh/g] | Capacity lowering rate [%] | Charge and discharge efficiency [%] |
|---|---|---|---|---|---|---|
| Example 1 | 7.85 | 0.12 | 3.62 | 183.6 | −3.3 | 91.2 |
| Example 2 | 7.92 | 0.09 | 3.16 | 183.4 | −3.4 | 91.3 |
| Example 3 | 7.13 | 0.13 | 2.77 | 188.5 | −0.7 | 92.8 |
| Example 4 | 6.45 | 0.13 | 1.87 | 182.8 | −3.7 | 90.3 |
| Example 5 | 7.15 | 0.14 | 2.21 | 184.2 | −3.0 | 90.4 |
| Example 6 | 7.79 | 0.09 | 3.67 | 189.4 | −0.2 | 92.6 |
| Comparative Example 1 | 10.84 | 0.25 | 11.5 | 189.8 | — | 92.1 |
| Comparative Example 2 | 8.96 | 0.19 | 9.66 | 189.6 | −0.1 | 92.0 |

[Evaluation]

Comparison between Examples 7 to 13 and Comparative Examples 3 to 4 revealed the following.

In Examples 7 to 13, the coating layer is formed by cladding a heteropoly acid or a heteropoly acid compound and undergoing a heat treatment. According to this, it was noted that the content of the carbonic acid component in the positive electrode active material is reduced.

Also, in Examples 7 to 13, it was noted that by cladding a heteropoly acid or a heteropoly acid compound and undergoing a heat treatment, the gas generation can be reduced, and the blister of a battery can be suppressed.

11. Other Embodiment (Modification Example)

It should not be construed that the present invention is limited to the foregoing embodiments, but various modifications and applications can be made within the range where the gist of the present invention is not deviated. For example, the shape of the nonaqueous electrolyte battery is not limited to those described previously, but it may be, for example, of a rectangular type, a coin type or the like.

Also, for example, a polymer solid electrolyte constituted of an ionic conductive polymer material, an inorganic solid electrolyte constituted of an ionic conductive inorganic material and the like may be used as the electrolyte. Examples of the ionic conductive polymer material include polyethers, polyesters, polyphosphazenes and polysiloxanes. Also, examples of the inorganic solid electrolyte include ionic conductive ceramics, ionic conductive crystals and ionic conductive glasses.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A positive electrode active material comprising:
   a lithium complex oxide particle; and
   a coating layer formed on at least a part of a surface of the lithium complex oxide particle, wherein
   the lithium complex oxide particle is composed mainly of nickel,
   the coating layer contains an oxo acid and/or an oxo acid compound,
   an acidity of the surface of the lithium complex oxide particle is increased by the coating layer,
   the acidity is determined based on a pH of a supernatant of water in a state where after 1.0 part by weight of the lithium complex oxide particle and having a coating layer formed thereon is dispersed in 50 parts by weight of water, the lithium complex oxide particle sediments, and
   the pH is less than 8.0.

2. The positive electrode active material according to claim 1, wherein
   a discharge capacity of the lithium complex oxide particle is lowered by the formation of the coating layer by less than 5% relative to the discharge capacity of the lithium complex oxide particle prior to the formation of the coating layer.

3. The positive electrode active material according to claim 1, wherein
   the lithium complex oxide particle has an average composition represented by the following formula (1)

$$Li_aNi_xCo_yAl_zO_2 \qquad (1)$$

wherein nickel is able to be substituted with one or two or more kinds of metal elements selected from the group consisting of manganese, chromium, iron, vanadium, magnesium, titanium, zirconium, niobium, molybdenum, tungsten, copper, zinc, gallium, indium, tin, lanthanum and cerium within the range of not more than 0.1 of Ni when the amount of the whole of Ni is defined to be 1; a, x, y and z are values falling within the ranges of ($0.20 \leq a \leq 1.40$), ($0.60 < x < 0.90$), ($0.10 < y < 0.40$) and ($0.01 < z < 0.20$), respectively; and x, y and z have the relationship of ($x+y+z$)=1.

4. The positive electrode active material according to claim 1, having a content of a carbonic acid ion of not more than 0.15% by weight.

5. The positive electrode active material according to claim 1, having an average particle size falling within the range of 2.0 μm or more and not more than 50 μm.

6. A nonaqueous electrolyte battery comprising:
a positive electrode;
a negative electrode; and
an electrolyte, wherein
the positive electrode includes a positive electrode active material,
the positive electrode active material includes a lithium complex oxide particle and a coating layer formed on at least a part of a surface of the lithium complex oxide particle,
the lithium complex oxide particle is a lithium complex oxide particle composed mainly of nickel,
the coating layer contains an oxo acid and/or an oxo acid compound,
an acidity of the surface of the lithium complex oxide particle is increased by the coating layer,
the acidity is determined based on a pH of a supernatant of water in a state where after 1.0 part by weight of the lithium complex oxide particle and having a coating layer formed thereon is dispersed in 50 parts by weight of water, the lithium complex oxide particle sediments, and
the pH is less than 8.0.

* * * * *